(12) United States Patent  
Emett et al.

(10) Patent No.: US 11,180,709 B2
(45) Date of Patent: Nov. 23, 2021

(54) FUNCTIONAL FLUIDS COMPRISING LOW-VISCOSITY, LOW-VOLATILITY POLYALPHA-OLEFIN BASE STOCK

(71) Applicant: ExxonMobil Chemical Patents Inc., Baytown, TX (US)

(72) Inventors: Craig J. Emett, Houston, TX (US); Babak LotfizadehDehkordi, Houston, TX (US); Najeeb M. Kuzhiyil, League City, TX (US); Wenning W. Han, Houston, TX (US); Heinrich R. Braun, Tiefenbach (DE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/968,750

(22) PCT Filed: Jan. 14, 2019

(86) PCT No.: PCT/US2019/013444
§ 371 (c)(1),
(2) Date: Aug. 10, 2020

(87) PCT Pub. No.: WO2019/160630
PCT Pub. Date: Aug. 22, 2019

(65) Prior Publication Data
US 2020/0407657 A1    Dec. 31, 2020

Related U.S. Application Data

(60) Provisional application No. 62/632,044, filed on Feb. 19, 2018.

(51) Int. Cl.
*C10M 107/10* (2006.01)
*C09K 5/10* (2006.01)
(Continued)

(52) U.S. Cl.
CPC ............. *C10M 107/10* (2013.01); *C09K 5/10* (2013.01); *C10M 2205/0285* (2013.01); (Continued)

(58) Field of Classification Search
CPC ........ C10M 107/10; C10M 2205/0285; C09K 5/10; C10N 2040/40; C10N 2030/74; C10N 2040/08; C10N 2040/04; C10N 2030/02
See application file for complete search history.

(56) References Cited

U.S. PATENT DOCUMENTS 5,595,966 A * 1/1997 Rees .................... C10M 101/04
508/591
2013/0090273 A1    4/2013 Martin et al.
(Continued)

FOREIGN PATENT DOCUMENTS

WO    2006/101583 A    9/2006
WO    2018/175830 A    9/2018

*Primary Examiner* — Ellen M McAvoy

(57) ABSTRACT

Disclosed are functional fluids such as automotive engine transmission fluids, clutch fluids, gearbox fluids, electric motor fluids, and/or battery packing cooling fluids comprising a low-viscosity, low-volatility Polyalpha-olefin base stock, and processes for lubricating and/or cooling an engine transmission, an electric motor, and/or a battery packing using such functional fluids.

28 Claims, 4 Drawing Sheets

(51) Int. Cl.
 *C10N 40/00* (2006.01)
 *C10N 30/00* (2006.01)
 *C10N 40/08* (2006.01)
 *C10N 40/04* (2006.01)
 *C10N 30/02* (2006.01)

(52) U.S. Cl.
 CPC ...... *C10N 2030/02* (2013.01); *C10N 2030/74* (2020.05); *C10N 2040/04* (2013.01); *C10N 2040/08* (2013.01); *C10N 2040/40* (2020.05)

(56) References Cited

U.S. PATENT DOCUMENTS

| | | | | |
|---|---|---|---|---|
| 2013/0090278 A1* | 4/2013 | Martin | | C10M 171/02 508/591 |
| 2013/0137617 A1* | 5/2013 | Lyon | | C10M 167/00 508/374 |
| 2017/0183594 A1* | 6/2017 | Courtiade | | C10M 105/04 |
| 2017/0226441 A1* | 8/2017 | Courtiade | | C10M 107/10 |
| 2018/0187117 A1* | 7/2018 | Courtiade | | C10M 177/00 |
| 2018/0371348 A1* | 12/2018 | Oumar-Mahamat | | C10M 105/04 |
| 2020/0339903 A1* | 10/2020 | Oki | | C10M 101/00 |

* cited by examiner

FUNCTIONAL FLUIDS COMPRISING LOW-VISCOSITY, LOW-VOLATILITY POLYALPHA-OLEFIN BASE STOCK

CROSS-REFERENCE OF RELATED APPLICATIONS

This application is a National Phase Application claiming priority to PCT Application Ser. No. PCT/US2019/013444, filed Jan. 14, 2019, which claims the benefit of and priority to U.S. Provisional Application Ser. No. 62/632,044, filed Feb. 19, 2018, which are referenced herewith in their entirety.

FIELD

This disclosure relates to functional fluids such as automotive engine transmission fluids, clutch fluids, gearbox fluids, electric motor cooling fluids, and battery pack cooling fluids. In particular, this disclosure relates to functional fluids comprising a low-viscosity, low-volatility polyalpha-olefin base stock.

BACKGROUND

Engine transmission fluids lubricates components in the transmission and helps cooling down the transmission in operation. Macro trends in transmission fluids are tending toward lower viscosities to achieve better fuel economy. As base stock viscosity is lowered, however, volatility for the base stock tends to increase, which can cause undesirable outcomes in lubricant performance such as fluid loss, increased wear, and the like. Likewise, gearbox fluids, clutch fluids, and other mechanical system lubricating fluids can benefit from lower operating viscosities as well to achieve a higher energy efficiency.

Additionally, development of hybrid and electric vehicles require transmission fluids that have very low viscosity base stocks in order to improve fuel economy and drive superior thermal transfer properties. These transmission fluids are exposed to high temperatures due to close contact with the electric motor, and thus the base stocks require low volatility, good oxidative stability, and good thermal stability properties. Electric motors and battery packs of hybrid vehicles and electric vehicles may need to be cooled during operation by functional fluids due to the heat generated by large discharge currents. Low viscosity, low volatility, good oxidation stability and good thermal stability are highly desirable for such functional fluids as well.

Conventional low-viscosity polyalpha-olefin ("PAO") base stocks made from oligomerization of alpha-olefin monomer in the presence of Lewis acid catalyst are available and indeed can be utilized in transmission fluids and other functional fluids. However, these fluids tend to suffer from one or more of the following: inadequate viscosity-volatility balance, insufficient oxidation stability and/or thermal stability, or a high viscosity in high-temperature, high-shear situations.

WO 2013/055480 A1 discloses a series of low-viscosity PAO base stocks made by (i) oligomerization of linear alpha-olefin ("LAO") monomer(s) in the presence of a catalyst system comprising a metallocene compound or (ii) a hybrid process including a first step of producing a second oligomer from oligomerization of LAO monomer(s) in the presence of a catalyst system comprising a metallocene compound, followed by oligomerization of the dimer with an LAO monomer in the presence of a Lewis acid catalyst. This patent reference also discloses engine oils comprising such low-viscosity PAO base stocks. However, no mention was made in this patent reference of the use of such low-viscosity PAO base stocks in transmission fluids.

SUMMARY

Figure 1:
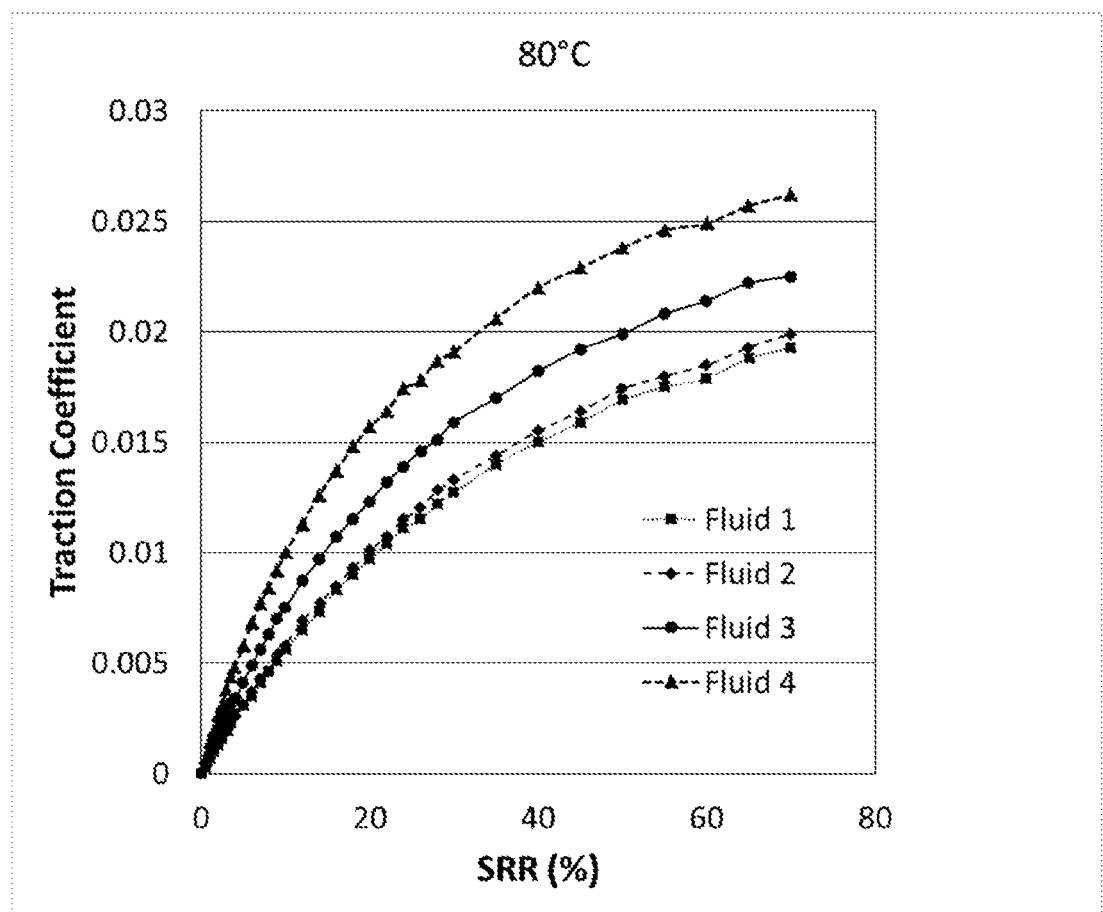
FIG. 1 is a diagram showing MTM traction at 80° C. of Fluids 1, 2, 3, and 4 in TABLE 14 of this disclosure.

It has been found that, in a surprising manner, low-viscosity PAO base stocks made by (i) oligomerization of linear alpha-olefin ("LAO") monomer(s) in the presence of a catalyst system comprising a metallocene compound or (ii) a hybrid process including a first step of producing a second oligomer such as a dimer from oligomerization of LAO monomer(s) in the presence of a catalyst system comprising a metallocene compound, followed by oligomerization of the second oligomer with an LAO monomer in the presence of a Lewis acid catalyst, have excellent properties for functional fluids such as transmission fluids, especially high-quality transmission fluids with good balance of low viscosity and low volatility, particularly suitable for demanding transmissions found in modern hybrid vehicles.

Thus, a first aspect of this disclosure relates to functional fluid for a transmission and/or an electric motor and/or a battery pack comprising a saturated polyalphaolefin ("PAO") first base stock at a concentration thereof in the range from 3 wt % to 98 wt %, based on the total weight of the functional fluid, the PAO base stock having: a kinematic viscosity at 100° C. determined pursuant to ASTM D445 ("KV100") in the range from 3.0 to 4.5 cSt, preferably ≤4.0 cSt, more preferably ≤3.6 cSt, still more preferably ≤3.5 cSt; and a Noack volatility determined pursuant to ASTM D5800 ("NV") not higher than 15%, preferably ≤12.5%.

A second aspect of this disclosure relates to process for lubricating and/or cooling an engine transmission, an electric motor, and/or a battery pack, comprising: (I) providing a functional fluid comprising a saturated polyalphaolefin ("PAO") first base stock at a concentration thereof in the range from 3 wt % to 98 wt %, based on the total weight of the functional fluid, the PAO base stock having: a kinematic viscosity at 100° C. determined pursuant to ASTM D445 ("KV100") in the range from 3.0 to 4.5 cSt, preferably 4.0 cSt, more preferably ≤3.6 cSt, still more preferably ≤3.5; and a Noack volatility determined pursuant to ASTM D5800 ("NV") not higher than 15%, preferably ≤12.5%; and (II) contacting the functional fluid with the engine transmission, the electric motor, and/or the battery pack.

DETAILED DESCRIPTION

The term "alkyl" or "alkyl group" interchangeably refers to a saturated hydrocarbyl group consisting of carbon and hydrogen atoms. An alkyl group can be linear, branched linear, cyclic, or substituted cyclic where the substitute is an alkyl.

The term "hydrocarbyl group" or "hydrocarbyl" interchangeably refers to a group consisting of hydrogen and carbon atoms only. A hydrocarbyl group can be saturated or unsaturated, linear or branched linear, cyclic or acyclic, aromatic or non-aromatic.

The term "Cn" group, compound or oligomer refers to a group, a compound or an oligomer comprising carbon atoms at total number thereof of n. Thus, a "Cm-Cn" group, compound or oligomer refers to a group, compound or oligomer comprising carbon atoms at a total number thereof in the range from m to n. Thus, a C28-C32 oligomer refers to an oligomer comprising carbon atoms at a total number thereof in the range from 28 to 32.

The term "carbon backbone" refers to the longest straight carbon chain in the molecule of the compound, group or oligomer in question. "Branch" refers to any non-hydrogen group connected to the carbon backbone.

The term "olefin" refers to an unsaturated hydrocarbon compound having a hydrocarbon chain containing at least one carbon-to-carbon double bond in the structure thereof, wherein the carbon-to-carbon double bond does not constitute a part of an aromatic ring. The olefin may be linear, branched linear, or cyclic. "Olefin" is intended to embrace all structural isomeric forms of olefins, unless it is specified to mean a single isomer or the context clearly indicates otherwise.

The term "alpha-olefin" refer to an olefin having a terminal carbon-to-carbon double bond in the structure thereof $((R^1R^2)-C=CH_2$, where $R^1$ and $R^2$ can be independently hydrogen or any hydrocarbyl group, preferably $R^1$ is hydrogen, and $R^2$ is an alkyl group). A "linear alpha-olefin" is an alpha-olefin defined in this paragraph wherein $R^1$ is hydrogen, and $R^2$ is hydrogen or a linear alkyl group.

The term "vinyl" means an olefin having the following formula:

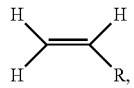

wherein R is a hydrocarbyl group, preferably a saturated hydrocarbyl group such as an alkyl group.

The term "vinylidene" means an olefin having the following formula:

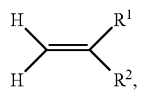

wherein $R^1$ and $R^2$ are each independently a hydrocarbyl group, preferably a saturated hydrocarbyl group such as alkyl group.

The term "1,2-di-substituted vinylene" means
(i) an olefin having the following formula:

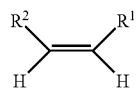

or
(ii) an olefin having the following formula:

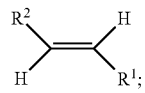

or
(iii) a mixture of (i) and (ii) at any proportion thereof,
wherein $R^1$ and $R^2$, the same or different at each occurrence, are each independently a hydrocarbyl group, preferably saturated hydrocarbyl group such as alkyl group.

The term "tri-substituted vinylene" means an olefin having the following formula:

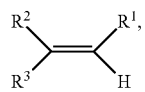

wherein $R^1$, $R^2$, and $R^3$ are each independently a hydrocarbyl group, preferably a saturated hydrocarbyl group such as alkyl group.

The term "tetra-substituted vinylene" means an olefin having the following formula:

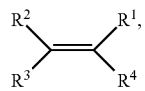

wherein $R^1$, $R^2$, $R^3$ and $R^4$ are each independently a hydrocarbyl group, preferably a saturated hydrocarbyl group such as alkyl group.

As used herein, "polyalpha-olefin(s)" ("PAO(s)") includes any oligomer(s) and polymer(s) of one or more alpha-olefin monomer(s). PAOs are oligomeric or polymeric molecules produced from the polymerization reactions of alpha-olefin monomer molecules in the presence of a catalyst system, optionally further hydrogenated to remove residual carbon-carbon double bonds therein. Thus, the PAO can be a dimer, a trimer, a tetramer, or any other oligomer or polymer comprising two or more structure units derived from one or more alpha-olefin monomer(s). The PAO molecule can be highly regio-regular, such that the bulk material exhibits an isotacticity, or a syndiotacticity when measured by $^{13}C$ NMR. The PAO molecule can be highly regio-irregular, such that the bulk material is substantially atactic when measured by $^{13}C$ NMR. A PAO material made by using a metallocene-based catalyst system is typically called a metallocene-PAO ("mPAO"), and a PAO material made by using traditional non-metallocene-based catalysts (e.g., Lewis acids, supported chromium oxide, and the like) is typically called a conventional PAO ("cPAO").

The term "pendant group" with respect to a PAO molecule refers to any group other than hydrogen attached to the carbon backbone other than those attached to the carbon atoms at the very ends of the carbon backbone.

The term "length" of a pendant group is defined as the total number of carbon atoms in the longest carbon chain in the pendant group, counting from the first carbon atom attached to the carbon backbone. The pendant group may contain a cyclic group or a portion thereof in the longest carbon chain, in which case half of the carbon atoms in the cyclic group are counted toward the length of the pendant group. Thus, by way of examples, a linear C8 pendant group has a length of 8; the pendant groups PG-1 (cyclohexylmethylene) and PG-2 (phenylmethylene) each has a length of 4; and the pendant groups PG-3 (o-heptyl-phenylmethylene) and PG-4 (p-heptylphenylmethylene) each has a length of 11. Where a PAO molecule contains multiple pendant groups, the arithmetic average of the lengths of all such pendant groups are calculated as the average length of the all pendant groups in the PAO molecule.

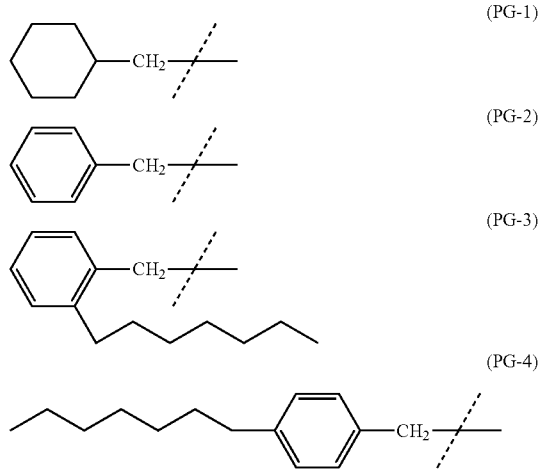

Unless specified otherwise, the term "substantially all" with respect to PAO molecules means at least 90 mol % (such as at least 95 mol %, at least 98 mol %, at least 99 mol %, or even 100 mol %).

Unless specified otherwise, the term "consist essentially of" means comprising at a concentration of at least 90 mol % (such as at least 95 mol %, at least 98 mol %, at least 99 mol %, or even 100 mol %).

Unless specified otherwise, the term "substantially free of" with respect to a particular component means the concentration of that component in the relevant composition is no greater than 10 mol % (such as no greater than 5 mol %, no greater than 3 mol %, or no greater than 1 mol %), based on the total quantity of the relevant composition.

As used herein, a "lubricant" refers to a substance that can be introduced between two or more moving surfaces and lower the level of friction between two adjacent surfaces moving relative to each other. A lubricant "base stock" is a material, typically a fluid at the operating temperature of the lubricant, used to formulate a lubricant by admixing it with other components. Non-limiting examples of base stocks suitable in lubricants include API Group I, Group II, Group III, Group IV, and Group V base stocks. Fluids derived from Fischer-Tropsch process or Gas-to-Liquid ("GTL") processes are examples of synthetic base stocks useful for making modern lubricants. GTL base stocks and processes for making them can be found in, e.g., WO 2005/121280 A1 and U.S. Pat. Nos. 7,344,631; 6,846,778; 7,241,375; 7,053,254.

All kinematic viscosity values in this disclosure are as determined according to ASTM D445. Kinematic viscosity at 100° C. is reported herein as KV100, and kinematic viscosity at 40° C. is reported herein as KV40. Unit of all KV100 and KV40 values herein is cSt, unless otherwise specified.

All viscosity index ("VI") values in this disclosure are as determined according to ASTM D2270.

All Noack volatility ("NV") values in this disclosure are as determined according to ASTM D5800 unless specified otherwise. Unit of all NV values is wt %, unless otherwise specified.

All pour points in this disclosure are as determined pursuant to ASTM D5950. Unit of all pour point values is ° C., unless otherwise specified.

All rotating pressure vessel oxidation test ("RPVOT") values in this disclosure are as determined pursuant to ASTM D2272. Unit of all RPVOT values is minute, unless otherwise specified.

All cold-crank-simulator viscosity ("CCSV") values in this disclosure are as determined pursuant to ASTM D5293. Unit of all CCSV values is centipoise (millipascal·second), unless otherwise specified.

All high-temperature high-shear viscosity ("HTHSV") values in this disclosure are as determined pursuant to ASTM D4683. Unit of HTHSV values is centipoise, unless otherwise specified.

All Brookfield viscosity ("Brookfield") values in this disclosure are as determined pursuant to ASTM D2983. Unit of Brookfield values is centipoise, unless otherwise specified.

All MRV apparent viscosity ("MRV") values in this disclosure are as determined pursuant to ASTM D4674. Unit of all MRV values is centipoise, unless otherwise specified.

All heat capacity values in this disclosure are as determined pursuant to ASTM E1269. Unit of heat capacity values is $J \cdot (g \cdot K)^{-1}$, unless otherwise specified.

All thermal conductivity values in this disclosure are as determined pursuant to ASTM E1269. Unit of thermal conductivity values is $W \cdot (m \cdot K)^{-1}$, unless otherwise specified.

All numerical values within the detailed description and the claims herein are modified by "about" or "approximately" the indicated value, and taking into account experimental error and variations that would be expected by a person having ordinary skill in the art.

In this disclosure, all percentages of pendant groups, terminal carbon chains, and side chain groups are by mole, unless specified otherwise. Percent by mole is expressed as "mol %," and percent by weight is expressed as "wt %."

In this disclosure, all molecular weight data are in the unit of $g \cdot mol^{-1}$. Molecular weight of oligomer or polymer materials (including hydrogenated and unsaturated PAO materials) and distribution thereof in this disclosure are measured by using gel permeation chromatography (GPC) equipped with a multiple-channel band filter based infrared detector ensemble IR5 (GPC-IR) with band region covering from 2700-3000 cm$^{-1}$ (all saturated C—H stretching vibration). Reagent grade 1,2,4-trichlorobenzene (TCB) (from Sigma-Aldrich) comprising 300 ppm antioxidant BHT is used as the mobile phase at a nominal flow rate of 1.0 mL/min and a nominal injection volume 200 μL. The whole system including transfer lines, columns, and detectors is contained in an oven maintained at 145° C. A given amount of sample is weighed and sealed in a standard vial with 10 μL flow marker (heptane) added thereto. After loading the vial in the auto-sampler, the oligomer or polymer is automatically dissolved in the instrument with 8 mL added TCB solvent at 160° C. with continuous shaking. The sample solution concentration is from 0.2 to 2.0 mg/ml, with lower concentrations used for higher molecular weight samples. The concentration, c, at each point in the chromatogram is calculated from the baseline-subtracted IR5 broadband signal, I, using the equation: c=αI, where α is the mass constant determined with polyethylene or polypropylene standards. The mass recovery is calculated from the ratio of the integrated area of the concentration chromatography over elution volume and the injection mass which is equal to the pre-determined concentration multiplied by injection loop volume. The molecular weight is determined by combining universal calibration relationship with Mark-Houwink equation in which the M-H parameters a/K=0.695/0.00012 for mPAO. Number-average molecular weight (Mn) and weight-average molecular weight (Mw) of an oligomer or polymer are obtained from the above process. The polydispersity index (PDI) of the material is then calculated as follows:

PDI=Mw/Mn.

NMR spectroscopy provides key structural information about the synthesized polymers. Proton NMR (1H-NMR) analysis of the unsaturated PAO material gives a quantitative breakdown of the olefinic structure types (viz. vinyl, 1,2-di-substituted vinylene, tri-substituted vinylene, and vinylidene). In this disclosure, compositions of mixtures of olefins comprising terminal olefins (vinyls and vinylidenes) and internal olefins (1,2-di-substituted vinylenes and tri-substituted vinylenes) are determined by using $^1$H-NMR. Specifically, a NMR instrument of at least 500 MHz is run under the following conditions: a 30° flip angle RF pulse, 120 scans, with a delay of 5 seconds between pulses; sample dissolved in CDCl$_3$ (deuterated chloroform); and signal collection temperature at 25° C. The following approach is taken in determining the concentrations of the various olefins among all of the olefins from an NMR spectrum. First, peaks corresponding to different types of hydrogen atoms in vinyls (T1), vinylidenes (T2), 1,2-di-substituted vinylenes (T3), and tri-substituted vinylenes (T4) are identified. Second, areas of each of the above peaks (A1, A2, A3, and A4, respectively) are then integrated. Third, quantities of each type of olefins (Q1, Q2, Q3, and Q4, respectively) in moles are calculated (as A1/2, A2/2, A3/2, and A4, respectively). Fourth, the total quantity of all olefins (Qt) in moles is calculated as the sum total of all four types (Qt=Q1+Q2+Q3+Q4). Finally, the molar concentrations (C1, C2, C3, and C4, respectively, in mol %) of each type of olefin, on the basis of the total molar quantity of all of the olefins, is then calculated (in each case, Ci=100*Qi/Qt).

In this disclosure, a process is described as comprising at least one "step." It should be understood that each step is an action or operation that may be carried out once or multiple times in the process, in a continuous or discontinuous fashion. Unless specified to the contrary or the context clearly indicates otherwise, the steps in a process may be conducted sequentially in the order as they are listed, with or without overlapping between one or more other step(s), or in any other order, as the case may be. In addition, one or more or even all steps may be conducted simultaneously with regard to the same or different batch of material. For example, in a continuous process, while a first step in a process is being conducted with respect to a raw material just fed into the beginning of the process, a second step may be carried out simultaneously with respect to an intermediate material resulting from treating the raw materials fed into the process at an earlier time in the first step. Preferably, the steps are conducted in the order described.

As used herein, the indefinite article "a" or "an" shall mean "at least one" unless specified to the contrary or the context clearly indicates otherwise. Thus, embodiments using "a given device" include embodiments where one, two or more such given devices is used, unless specified to the contrary or the context clearly indicates that only one such given device is used.

Unless otherwise indicated, all numbers indicating quantities in this disclosure are to be understood as being modified by the term "about" in all instances. It should also be understood that the precise numerical values used in the specification and claims constitute specific embodiments. Efforts have been made to ensure the accuracy of the data in the examples.

However, it should be understood that any measured data inherently contain a certain level of error due to the limitation of the technique and equipment used for making the measurement.

I. The PAO First Base Stock

The functional fluids of this disclosure comprises a PAO first base stock as the primary base stock or a co-base stock. The PAO first base stock is desirably a low-viscosity, low-volatility base stock particularly suitable for use in functional fluids for engine transmissions for internal combustion engines, including automatic and manual transmissions, gas/electric hybrid engine transmissions, diesel/electric hybrid engine transmissions, electric motors, and even battery packs, for purposes of lubricating and/or cooling the transmissions, electrical motors and/or the battery packs, such as those installed in modern gas or diesel powered, gas/electric powered, diesel/electric powered, and electrically powered automobiles.

The PAO first base stock desirably has a KV100 in the range from v1 to v2 cSt, where v1 and v2 can be, independently, 3.0, 3.1, 3.2, 3.3, 3.4, 3.5, 3.6, 3.7, 3.8, 3.9, 4.0, 4.1, 4.2, 4.3, 4.4, and 4.5. Preferably, v1=3.0, and v2=4.0. More preferably, v1=3.0, and v2=3.6. More preferably v1=3.0, and v2 =3.5. The low viscosity of the PAO first base stock reduces traction loss during the high speed movement of the components in the transmission, resulting in high energy efficiency and low transmission operating temperature. The low viscosity of the PAO first base stock enables high-velocity circulation of the functional fluid when pumped in a circuit, achieving the ability of high cooling efficiency if used as a cooling medium for an electric motor and/or a battery backpack.

The PAO first base stock desirably has a low NV value of no greater than 15.0 wt %, preferably no greater than 14.0 wt %, more preferably no greater than 13.0 wt %, still more preferably no greater than 12.5 wt %, determined pursuant to ASTM D5800. Compared to conventional PAO base stocks available commercially at the same viscosity, the PAO base stock in the functional fluids of this disclosure tends to have lower NV values. The low NV values of the PAO first base stock contributes to consistent viscosity and performance of the functional fluids of this disclosure over a long service period without the need of servicing and fluid replacement.

The PAO first base stock may desirably have a thermal conductivity at 40° C. in the range from 0.11 to 0.16 W·(m·K)$^{-1}$.

The PAO first base stock desirably are saturated alkanes substantially free of olefinic double bonds in the molecules thereof.

The PAO first base stock may desirably have a cold-cranking simulator viscosity at −35° C. determined pursuant to ASTM ("CCSV") no higher than 1,000 centipoise. Desirably, the PAO first base stock may have a CCSV at −35° C. in the range from a1 to a2 centipoise, where a1 and a2 can be, independently, 500, 550, 600, 650, 700, 750, 800, 850, 900, or 1000, as long as a1<a2. The exceedingly low CCSV of the PAO first base stock renders particularly useful in an engine transmission fluid operating from time to time at low temperature in cold climate. Compared to conventional PAO base stocks available commercially, the PAO first base stock can be particularly advantageous in this regard.

The PAO first base stock may desirably have a high-temperature, high-shear viscosity determined pursuant to ASTM D4683 ("HTHSV") at 150° C. of no greater than 1.4 centipoise. Desirably, the PAO first base stock may have a HTHSV at 150° C. in the range from 1.0 to 1.4 centipoise, preferably from 1.0 to 1.3 poise, more preferably from 1.0 to 1.2 poise. A lower HTHSV can provide improved fuel economy to the lubricating application since the lower viscosity can result in reduced friction.

The PAO first base stock desirably has a high oxidation stability indicated by rotating pressure vessel oxidation test (RPVOT) break time, determined pursuant to ASTM D-2272, of at least about 60 minutes, preferably at least 70 minutes, more preferably at least 80 minutes. Compared to conventional low-viscosity PAO base stocks manufactured by alpha-olefin oligomerization in the presence of conventional Lewis acid such as $BF_3$ having similar KV100 values, the PAO first base stock can have significantly higher oxidation stability indicated by a significantly longer RPVOT time.

The PAO first base stock desirably may comprise C28-C32 polyalpha-olefin oligomers at a total concentration thereof of no less than 90 wt %, preferably no less than 92 wt %, more preferably no less than 94 wt %, still more preferably no less than 95 wt %, still more preferably no less than 96 wt %, still more preferably no less than 97 wt %, still more preferably no less than 98 wt %, based on the total weight of the first base stock. A narrow molecular weight distribution is achieved by such high percentage of oligomers having close molecular weights.

In one embodiment, the PAO first base stock desirably may comprise C30 polyalpha-olefin oligomers at a total concentration thereof of no less than 90 wt %, preferably no less than 92 wt %, more preferably no less than 94 wt %, still more preferably no less than 95 wt %, still more preferably no less than 96 wt %, still more preferably no less than 97 wt %, still more preferably no less than 98 wt %, based on the total weight of the first base stock. The C30 polyalpha-olefin oligomers may be conveniently represented by formula $C_{30}H_{62}$, which may be a mixture of multiple (e.g., two, three, four, or more) alkane isomers. In one example, such PAO first base stock may comprise one predominant compound having formula $C_{30}H_{62}$ at a total concentration of at least 50 wt %, 60 wt %, 70 wt %, 80 wt %, or even 90 wt %, based on the total moles of the $C_{30}H_{62}$ isomers.

The PAO first base stock may comprise polyalpha-olefin oligomers having the following formula at a total concentration thereof, based on the total weight of the first base stock, of no less than 50 wt %, preferably no less than 60 wt %, more preferably no less than 70 wt %, still more preferably no less than 80 wt %, still more preferably no less than 90 wt %, still more preferably no less than 95 wt %:

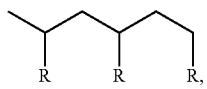

wherein each R is independently an n-butyl, n-hexyl, n-octyl, n-decyl, or n-dodecyl. Preferably such PAO oligomers are C28 to C32 oligomers. Preferably, the different R groups contain carbon numbers differing by no more than 2. In one preferred example, all R groups are n-octyl.

The PAO first base stock desirably has high oxidation resistance, especially at high operation temperatures inside an engine transmission, particularly a hybrid engine transmission. Please provide description of oxidation resistance of this material; explain what causes the high oxidation resistance of this base stock material.

II. Processes for Making the PAO First Base Stock

At least a portion of the PAO first base stock can be desirably made from a process selected from:
(i) a first process comprising oligomerizing one or more C6 to C14 alpha-olefin in the presence of a catalyst system comprising a metallocene compound to obtain a first oligomer mixture, separating a first unhydrogenated precursor to the first base stock from the oligomer mixture, followed by hydrogenating the first unhydrogenated precursor; and
(ii) a second process comprising: a first step of producing a second oligomer of one or more C6 to C14 alpha-olefin in the presence of a catalyst system comprising a metallocene compound, a second step of reacting the second oligomer with one or more C6 to C14 alpha-olefin in the presence of a Lewis acid catalyst to obtain a third oligomer mixture, a third step of separating a second unhydrogenated precursor to the first base stock from the third oligomer mixture, followed by a fourth step hydrogenating the second unhydrogenated precursor.

Thus, the entirety of the PAO first base stock can be made by either process (i) or process (ii) above. Alternatively, PAO oligomers made by process (i) and those by process (ii) above may be combined together at any proportion to make the PAO first base stock of this disclosure.

WO 2013/055480 A1 discloses processes (i) and (ii) above, the content of which is incorporated herein by reference in its entirety.

In either process (i) or process (ii), the C6 to C14 alpha-olefin are preferably linear alpha-olefins, e.g., 1-hexene, 1-octene, 1-decene, 1-dodecene, and 1-tetradecene. Preferred alpha-olefins for processes (i) and (ii) are 1-octene, 1-decene, and 1-dodecene. Most preferred alpha-olefin is 1-decene, especially in cases where a single alpha-olefin is used in making the PAO first base stock. If two different alpha-olefins are used at substantial concentrations (e.g., higher than 5 mol %, based on the total moles of the alpha-olefins), it is preferred that they contain carbon numbers differing by no more than 4, still more preferably by no more than 2. If three different alpha-olefins are used at substantial concentrations, it is preferred that they contain carbon numbers differing by no more than 6, still more preferably by no more than 4. Close molecular weights of the multiple alpha-olefin monomers used in the processes contribute to highly uniform molecular weights among the molecules included in the first PAO base stock. In one preferred embodiment, in either process (i) or (ii), a single alpha-olefin monomer is used for making the PAO first base stock. In one preferred embodiment of process (ii), in the first step, a single alpha-olefin is used for making the second oligomer. In one preferred embodiment of process (ii), in the first step, the second oligomer is a dimer of the alpha-olefin(s).

In one preferred embodiments of process (i), the first unhydrogenated precursor consists essentially of trimer(s). Thus, where 1-decene is used as the single alpha-olefin for making the PAO first base stock in process (i), the first unhydrogenated precursor preferably consists essentially of $C_{30}H_{60}$.

In one preferred embodiment of process (ii), the second oligomer consists essentially of dimer(s). Thus, where 1-decene is used as the single alpha-olefin for making the second oligomer, the second oligomer preferably consist essentially of $C_{20}H_{40}$. In such scenarios, the second unhydrogenated precursor preferably consists of trimer(s). Thus, where 1-decene is used as the single alpha-olefin for making the second oligomer and the third oligomer mixture, the second unhydrogenated precursor preferably consists essentially of $C_{30}H_{60}$.

In one preferred embodiment of process (ii), the second oligomer comprises at least 20 (or 25, 30, 35, 40, 45, 50, 55, 60) wt % of tri-substituted olefins. In such embodiment, the second unhydrogenated precursor preferably comprises, in total, at least 50 (or 55, 60, 65, 70, 75, or even 80) wt % of tri-substituted and tetra-substituted olefins combined, based on the total moles of the olefins in the second unhydrogenated precursor.

It is believed that upon hydrogenation, substantially all of the C=C double bonds present in the olefinic oligomer molecules in the first unhydrogenated precursor or the second unhydrogenated precursor are saturated and alkane molecules are produced to make up the PAO first base stock of this disclosure.

III. The Functional Fluid

III.1 General

The functional fluid of this disclosure comprises the PAO first base stock described above as a major component. The concentration of the PAO first base stock in the functional fluid of this disclosure can range from, e.g., x1 to x2 wt %, where x1 and x2 can be, independently, 3, 4, 5, 6, 7, 8, 9, 10, 15, 20, 25, 30, 35, 40, 45, 50, 55, 60, 65, 70, 75, 80, 85, 90, 95, 96, 97, 98, 99 as long as x1<x2, based on the total weight of the functional fluid.

As indicated above, the PAO base stock can be present in the functional fluid as a primary stock or a co-base stock. Particularly, where the functional fluid is an automotive transmission fluid, a clutch fluid, or a battery pack cooling fluid, the PAO first base stock may be present advantageously as a primary base stock at a concentration of e.g., at least 50 wt %, based on the total weight of the functional fluid. Where the functional fluid is an industrial gearbox fluid, which can comprise a high-viscosity PAO base stock as a primary base stock, the low-viscosity PAO first base stock may be present in the functional fluid as a co-base stock included at a relatively low treat rate, e.g., in the range from 3 wt % to 20 wt %, based on the total weight of the functional fluid.

Thus, the functional fluid of this disclosure desirably has a KV100 in the range from v3 to v4 cSt, where v3 and v4 can be, independently, 3.5, 3.6, 3.7, 3.8, 3.9, 4.0, 4.1, or 4.2, as long as v3<v4. Preferably, v3=3.5, and v4=4.0. More preferably, v3=3.5, and v4=3.8.

The functional fluid of this disclosure desirably has a low Noack Volatility ("NV") value in the range from 10 to 15 wt %, preferably from 10 to 13 wt %, more preferably from 10 to 12 wt %, still more preferably from 10 to 11 wt %. Lower NV value translates to less loss of the fluid throughout the service life and hence a more consistent performance of the fluid throughout a fixed drain interval, and/or a longer service life at a given fluid loss target. The low NV value of the functional fluids of this disclosure is imparted at least in part by the low NV value of the first PAO base stock.

The functional fluid of this disclosure can desirably have a high thermal transfer efficacy.

The functional fluid of this disclosure can benefit from the high oxidation stability of the first PAO base stock and enjoy a long service life.

The functional fluid of this disclosure can be any engine transmission fluid. Engine transmission fluids are typically placed into the housing of a transmission unit including multiple moving parts such as cogs. The transmission fluid present between the hard surfaces (e.g., metal surfaces) moving against each other desirably forms a thin film which protects the surfaces from direct contact and abrasion. Lower viscosity of the transmission fluid reduces traction loss and hence is desirable.

The functional fluid of this disclosure can be particularly advantageously a gas-electric or diesel-electric hybrid engine transmission fluid. In hybrid-engine powered vehicles, the transmission fluid typically contact both the transmission and an electric motor that can run at high temperature when high electric current passes through. The high oxidation stability of the first PAO base stock lends thermal stability to the functional fluid containing it as a primary component.

The functional fluids of this disclosure can be a cooling fluid for an electrical motor or a battery pack. In high-current situations, the electric motor and the battery pack of an electrically-powered vehicle or a hybrid vehicle can reach a high temperature if not properly cooled. The low-viscosity, high oxidation stability functional fluid of this disclosure can provide excellent cooling efficacy for the electric motor and/or battery packs.

III.2 Other Base Stocks Useful in the Lubricating Oil

A wide range of lubricating oil base stocks known in the art can be used in conjunction with the PAO first base stock in the functional fluids of this disclosure, typically as co-base stock. Such other base stocks can be either derived from natural resources or synthetic, including un-refined, refined, or re-refined oils. Un-refined oil base stocks include shale oil obtained directly from retorting operations, petroleum oil obtained directly from primary distillation, and ester oil obtained directly from a natural source (such as plant matters and animal tissues) or directly from a chemical esterification process. Refined oil base stocks are those un-refined base stocks further subjected to one or more purification steps such as solvent extraction, secondary distillation, acid extraction, base extraction, filtration, and percolation to improve the at least one lubricating oil property. Re-refined oil base stocks are obtained by processes analogous to refined oils but using an oil that has been previously used as a feed stock.

API Groups I, II, III, IV and V are broad categories of base stocks developed and defined by the American Petroleum Institute (API Publication 1509; www.API.org) to create guidelines for lubricant base stocks. Group I base stocks generally have a viscosity index of from about 80 to 120 and contain greater than about 0.03% sulfur and less than about 90% saturates. Group II base stocks generally have a viscosity index of from about 80 to 120, and contain less than or equal to about 0.03% sulfur and greater than or equal to about 90% saturates. Group III base stocks generally have a viscosity index greater than about 120 and contains less than or equal to about 0.03% sulfur and greater than about 90% saturates. Group IV includes polyalphaolefins (PAO). Group V base stocks include base stocks not included in Groups I-IV. The table below summarizes properties of each of these five groups.

| Base Stock Properties | | | |
| --- | --- | --- | --- |
| | Saturates | Sulfur | Viscosity Index |
| Group I | Higher than 90 and/or | Higher than 0.03% and | At least 80 and at most 120 |
| Group II | Higher than 90 and | At most 0.03% and | At least 80 and at most 120 |
| Group III | At least 90 and | At most 0.03% and | At least 120 |
| Group IV | PAO products | | |
| Group V | All other products not included in Groups I, II, III, and IV | | |

Natural oils include animal oils (e.g. lard), vegetable oils (e.g., castor oil), and mineral oils. Animal and vegetable oils possessing favorable thermal oxidative stability can be used. Of the natural oils, mineral oils are preferred. Mineral oils vary widely as to their crude source, e.g., as to whether they are paraffinic, naphthenic, or mixed paraffinic-naphthenic. Oils derived from coal or shale are also useful in this disclosure. Natural oils vary also as to the method used for their production and purification, e.g., their distillation range and whether they are straight run or cracked, hydrorefined, or solvent extracted.

Group II and/or Group III base stocks are generally hydroprocessed or hydrocracked base stocks derived from crude oil refining processes.

Synthetic base stocks include polymerized and interpolymerized olefins (e.g., polybutylenes, polypropylenes, propylene isobutylene copolymers, ethylene-olefin copolymers, and ethylene-alpha-olefin copolymers).

Synthetic polyalpha-olefins ("PAO") base stocks are placed into Group IV. Advantageous Group IV base stocks are those made from one or more of C6, C8, C10, C12, and C14 linear alpha-olefins ("LAO"s). These base stocks can be commercially available at a wide range of viscosity, such as a KV100 in the range from 1.0 to 1,000 cSt. The additional PAO base stocks can be made by polymerization of the LAO(s) in the presence of Lewis-acid type catalyst, or in the presence of a metallocene compound-based catalyst system. High quality Group IV PAO commercial base stocks including the SpectraSyn™ and SpectraSyn Elite™ series available from ExxonMobil Chemical Company having an address at 4500 Bayway Drive, Baytown, Tex. 77450, United States.

All other synthetic base stocks, including but not limited to alkyl aromatics and synthetic esters are in Group V.

Esters in a minor amount may be useful in the functional fluids of this disclosure. Additive solvency and seal compatibility characteristics may be imparted by the use of esters such as the esters of dibasic acids with monoalkanols and the polyol esters of monocarboxylic acids. Esters of the former type include, e.g., the esters of dicarboxylic acids such as phthalic acid, succinic acid, sebacic acid, fumaric acid, adipic acid, linoleic acid dimer, malonic acid, alkyl malonic acid, alkenyl malonic acid, etc., with a variety of alcohols such as butyl alcohol, hexyl alcohol, dodecyl alcohol, 2-ethylhexyl alcohol, etc. Specific examples of these types of esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, etc. Useful ester-type Group V base stock include the Estere$^{vT™}$ series commercially available from ExxonMobil Chemical Company.

One or more of the following maybe used as a base stock in the functional fluids of this disclosure as well: (1) one or more Gas-to-Liquids (GTL) materials; and (2) hydrodewaxed, hydroisomerized, solvent dewaxed, or catalytically dewaxed base stocks derived from synthetic wax, natural wax, waxy feeds, slack waxes, gas oils, waxy fuels, hydrocracker bottoms, waxy raffinate, hydrocrackate, thermal crackates, foots oil, and waxy materials derived from coal liquefaction or shale oil. Such waxy feeds can be derived from mineral oils or non-mineral oil processing or can be synthetic (e.g., Fischer-Tropsch feed stocks). Such base stocks preferably comprise linear or branched hydrocarbyl compounds of C20 or higher, more preferably C30 or higher.

The functional fluids of this disclosure can comprise one or more Group I, II, III, IV, or V base stocks in addition to the CCSV-boosting base stock. Preferably, Group I base stocks, if any, are present at a relatively low concentration if a high quality functional fluid is desired. Group I base stocks may be introduced as a diluent of an additive package at a small quantity. Groups II and III base stocks can be included in the functional fluids of this disclosure, but preferably only those with high quality, e.g., those having a VI from 100 to 120. Group IV and V base stocks, preferably those of high quality, can be desirably included into the functional fluids of this disclosure, as a co-base stock at treat rate lower than the PAO first base stock.

III.3 Additives

The functional fluids of this disclosure may additionally contain one or more of the commonly used lubricating oil performance additives including but not limited to dispersants, detergents, viscosity modifiers, antiwear additives, corrosion inhibitors, rust inhibitors, metal deactivators, extreme pressure additives, anti-seizure agents, wax modifiers, viscosity modifiers, fluid-loss additives, seal compatibility agents, lubricity agents, anti-staining agents, chromophoric agents, defoamants, demulsifiers, densifiers, wetting agents, gelling agents, tackiness agents, colorants, and others. For a review of many commonly used additives and the quantities used, see: (i) Klamann in Lubricants and Related Products, Verlag Chemie, Deerfield Beach, Fla.; ISBN 0-89573-177-0; (ii) "Lubricant Additives," M. W. Ranney, published by Noyes Data Corporation of Parkridge, N.J. (1973); (iii) "Synthetics, Mineral Oils, and Bio-Based Lubricants," Edited by L. R. Rudnick, CRC Taylor and Francis, 2006, ISBN 1-57444-723-8; (iv) "Lubrication Fundamentals", J.G. Wills, Marcel Dekker Inc., (New York, 1980); (v) Synthetic Lubricants and High-Performance Functional Fluids, 2nd Ed., Rudnick and Shubkin, Marcel Dekker Inc., (New York, 1999); and (vi) "Polyalphaolefins," L. R. Rudnick, Chemical Industries (Boca Raton, Fla., United States) (2006), 111 (Synthetics, Mineral Oils, and Bio-Based Lubricants), 3-36. Reference is also made to: (a) U.S. Pat. No. 7,704,930 B2; (b) U.S. Pat. No. 9,458,403 B2, Column 18, line 46 to Colum 39, line 68; (c) U.S. Pat. No. 9,422,497 B2, Column 34, line 4 to Colum 40, line 55; (d) U.S. Pat. No. 8,048,833 B2, Column 17, line 48 to Colum 27, line 12; (e) US Patent Application Publication No. 2014/0113847 A1, page 7, paragraph [0083] to page 15, paragraph [0215], and (f) the disclosures of which are incorporated herein in its entirety. These additives are commonly delivered with varying amounts of diluent oil that may range from 5 wt % to 50 wt % based on the total weight of the additive package before incorporation into the formulated oil. The additives useful in this disclosure do not have to be soluble in the functional fluids. Insoluble additives in oil can be dispersed in the functional fluids of this disclosure.

When functional fluids contain one or more of the additives discussed above, the additive(s) are blended into the oil composition in an amount sufficient for it to perform its intended function.

It is noted that many of the additives are shipped from the additive manufacturer as a concentrate, containing one or more additives together, with a certain amount of base oil diluents. Accordingly, the weight amounts in the table below, as well as other amounts mentioned herein, are directed to the amount of active ingredient (that is the non-diluent portion of the ingredient). The weight percent (wt %) indicated below is based on the total weight of the lubricating oil formulation.

Examples of techniques that can be employed to characterize the CCSV-boosting base stock described above include, but are not limited to, analytical gas chromatography, nuclear magnetic resonance, thermogravimetric analysis (TGA), inductively coupled plasma mass spectrometry, differential scanning calorimetry (DSC), and volatility and viscosity measurements.

This disclosure is further illustrated by the following non-limiting examples.

EXAMPLES

Preparation of Low Viscosity PAO Base Stocks

Nuclear magnetic resonance spectroscopy (NMR), augmented by the identification and integration of end group resonances and removal of their contributions to the peak areas, were used to identify the structures of the synthesized oligomers and quantify the composition of each structure.

Proton NMR (also frequently referred to as HNMR) spectroscopic analysis can differentiate and quantify the types of olefinic unsaturation: vinylidene, 1,2-di-substituted, tri-substituted, or vinyl. Carbon-13 NMR (referred to simply as C-NMR) spectroscopy can confirm the olefin distribution calculated from the proton spectrum. Both methods of NMR analysis are well known in the art.

Quantitative analysis of the olefinic distribution for structures in a pure dimer sample that contain unsaturated hydrogen atoms was performed by HNMR and is described below. Since the technique detects hydrogen, any unsaturated species (Tetra-substituted olefins) that do not contain olefinic hydrogens are not included in the analysis (C-NMR must be used for determining Tetra-substituted olefins). Analysis of the olefinic region was performed by measuring the normalized integrated intensities in the identified spectral regions. The relative number of olefinic structures in the sample were then calculated by dividing the respective region intensities by the number of olefinic hydrogen species in the unsaturated structures represented in that region. Finally, percentages of the different olefin types were determine by dividing the relative amount of each olefin type by the sum of these olefins in the sample.

C-NMR was used to identify and quantify olefinic structures in the fluids. Classification of unsaturated carbon types that is based upon the number of attached hydrogen atoms was determined by comparing spectra collected using the APT (Patt, S. L.; Shoolery, N., J. Mag. Reson., 46:535 (1982)) and DEPT (Doddrell, D. M.; Pegg, D. T.; Bendall, M. R., J. Mag. Reson., 48:323 (1982)) pulse sequences. APT data detects all carbons in the sample and DEPT data contains signals from only carbons that have attached hydrogens. Carbons having odd number of hydrogen atoms directly attached are represented with signals with having an opposite polarity from those having two (DEPT data) or in the case of the APT spectra zero or two attached hydrogens. Therefore, the presence of a carbon signal in an APT spectra that is absent in the DEPT data and which has the same signal polarity as a carbon with two attached hydrogen atoms is indicative of a carbon without any attached hydrogens. Carbon signals exhibiting this polarity relationship that are in the chemical shift range between 105 and 155 ppm in the spectrum are classified as carbons in olefinic structures.

With olefinic carbons previously being classified according to the number of hydrogens that are attached signal intensity can be used to identify the two carbons that are bonded together in an unsaturated structure. The intensities used were evaluated from a C-NMR spectrum that was collected using quantitative conditions. Because each olefinic bond is composed of a pair of carbons the signal intensity from each will be similar. Thus, by matching intensities to the carbon types identified above different kinds of olefinic structures present in the sample were determined.

As already discussed previously, vinyl olefins are defined as containing one unsaturated carbon that is bonded to two hydrogens bonded to a carbon that contains one hydrogen, vinylidene olefins are identified as having a carbon with two hydrogens bonded to a carbon without any attached hydrogens, and tri-substituted olefins are identified by having both carbons in the unsaturated structure contain one hydrogen atom. Tetra-substituted olefin carbons are unsaturated structures in which neither of the carbons in the unsaturated structure have any directly bonded hydrogens.

A quantitative C-NMR spectrum was collected using the following conditions: 50 to 75 wt % solutions of the sample in deuterated chloroform containing 0.1 M of the relaxation agent Cr(acac)$_3$ (tris (acetylacetonato)-chromium (III)) was placed into a NMR spectrometer. Data was collected using a 30 degree pulse with inverse gated $^1$H decoupling to suppress any nuclear Overhauser effect and an observe sweep width of 200 ppm.

Quantitation of the olefinic content in the sample is calculated by ratioing the normalized average intensity of the carbons in an olefinic bond multiplied by 1000 to the total carbon intensity attributable to the fluid sample. Percentages of each olefinic structure can be calculated by summing all of the olefinic structures identified and dividing that total into the individual structure amounts.

Gas chromatography (GC) was used to determine the composition of the synthesized oligomers by molecular weight. The gas chromatograph is a HP model equipped with a 15 meter dimethyl siloxane. A 1 microliter sample was injected into the column at 40° C., held for 2 minutes, program-heated at 11° C. per minute to 350° C. and held for 5 minutes. The sample was then heated at a rate of 20° C. per minute to 390° C. and held for 17.8 minutes. The content of the dimer, trimer, tetramer of total carbon numbers less than 50 can be analyzed quantitatively using the GC method. The distribution of the composition from dimer, trimer and tetramer and/or pentamer can be fit to a Bernoullian distribution and the randomness can be calculated from the difference between the GC analysis and best fit calculation.

Example 1

A 97% pure 1-decene was fed to a stainless steel Parr reactor where it was sparged with nitrogen for 1 hour to obtain a purified feed. The purified stream of 1-decene was then fed at a rate of 2080 grams per hour to a stainless steel Parr reactor for oligomerization. The oligomerization temperature was 120° C. The catalyst was dimethylsilyl-bis (tetrahydroindenyl) zirconium dimethyl (hereinafter referred to as "Catalyst 1"). A catalyst solution including purified toluene, tri n-octyl aluminum (TNOA), and N,N-dimethylanilinium tetrakis (penta-flourophenyl) borate (hereinafter referred to as "Activator 1") was prepared per the following recipe based on 1 gram of Catalyst 1:

| Catalyst 1: | 1 gram |
|---|---|
| Purified Toluene: | 376 grams |
| 25% TNOA in Toluene: | 24 grams |
| Activator 1: | 1.9 grams. |

The 1-decene and catalyst solution were fed into the reactor at a ratio of 31,200 grams of 1-decene per gram of catalyst solution. Additional TNOA was also used as a scavenger to remove any polar impurities and added to the reactor at a rate of 0.8 grams of 0.25% TNOA in toluene per 100 grams of purified LAO. The residence time in the reactor was 2.7 hours. The reactor was run at liquid full conditions, with no addition of any gas.

When the system reached steady-state, a sample was taken from the reactor effluent and the dimer portion was separated by distillation. The mass percentage of each type of olefin in the distilled intermediate PAO dimer, as determined by proton NMR, is shown in TABLE 1. This example provides a characterization of the olefinic composition of the intermediate PAO dimer formed in the first step of the process of the invention.

TABLE 1

| Olefin Type | Percent by Mass of Olefin in Dimer Mixture |
|---|---|
| Vinylidene | 29% |
| Tri-substituted Vinylene | 60% |
| di-substituted vinylene | 11% |

Example 2

The reactor effluent from Example 1 was distilled to remove the unreacted 1-decene and to separate the olefin fractions. The different olefin fractions were each hydrogenated in a stainless steel Parr reactor at 232° C. and 2413 kPa (350 psi) of hydrogen for 2 hours using 0.5 wt % Nickel Oxide catalyst. Properties of each hydrogenated distillation cut are shown in TABLE 2. This example demonstrates that, with the exception of the intermediate PAO dimer, the intermediate PAO cuts have excellent properties.

TABLE 2

| Component | Oligomer Yield (%)* | KV at 100° C. (cSt) | KV at 40° C. (cSt) | VI | Pour Point (° C.) | Noack Volatility (%) |
|---|---|---|---|---|---|---|
| Intermediate PAO Dimer (C20) | 33 | 1.79 | 4.98 | N/A | −12 | N/A |
| Intermediate PAO Trimer (C30) | 31 | 3.39 | 13.5 | 128 | −75 | 12.53 |
| Intermediate PAO Tetramer+ (C40+) | 31 | 9.34 | 53.57 | 158 | −66 | 3.15 |

Yields reported are equivalent to mass % of reactor effluent; 6% of reactor effluent was monomer.

Example 3 mPAO dimer portion from a reaction using the procedure of Example 1 (and therefor having the properties/components listed above), and prior to any hydrogenation of the dimer, was oligomerized with 1-decene in a stainless steel Parr reactor using a BF3 catalyst promoted with a $BF_3$ complex of butanol and butyl acetate. The intermediate PAO dimer and 1-decene monomer were fed at a dimer to monomer mass ratio of 2:1. The reactor temperature was 32° C. with a 34.47 kPa (5 psi) partial pressure of $BF_3$ and catalyst concentration was 30 mmol of catalyst per 100 grams of feed. The catalyst and feeds were stopped after one hour and the reactor contents were allowed to react for one hour. A sample was then collected and analyzed by GC. TABLE 3 compares conversion of the intermediate PAO dimer and conversion of 1-decene. TABLE 4 gives properties and yield of the PAO co-dimer resulting from the reaction of the LAO and intermediate PAO dimer.

The data in TABLEs 3 and 4 demonstrate that the intermediate PAO dimer from Example 1 is highly reactive in a Lewis acid catalyzed oligomerization and that it produces a co-dimer with excellent properties. Because the 1-decene dimer has the same carbon number as the intermediate mPAO dimer, it is difficult to determine exactly how much intermediate mPAO dimer was converted. TABLE 3 specifies the least amount of intermediate PAO dimer converted (the assumption being that all dimer in the reactor effluent was unreacted intermediate PAO) and also the estimated amount converted, calculated by assuming that only the linear portion of the dimer GC peak is unreacted intermediate PAO dimer and the other portion is formed by the dimerization of 1-decene.

A codimer (C30) fraction was obtained by distilling the oligomerization mixture. NMR spectra of the codimer showed the following composition: 4% vinylidene, 77% tri-substituted olefins, and 19% tetra-substituted olefin.

Example 4

The procedure of Example 3 was followed, except that the unhydrogenated intermediate PAO dimer portion was reacted with 1-octene instead of 1-decene. Results are shown in TABLEs 3 and 4 below. Because the 1-octene dimer has a different carbon number than the intermediate PAO dimer, conversion of the intermediate PAO dimer is measured and need not be estimated.

Example 5

The procedure of Example 3 was followed, except that the unhydrogenated intermediate PAO dimer portion was reacted with 1-dodecene instead of 1-decene. Results are shown in TABLEs 3 and 4 below.

TABLE 3

| Example | LAO Feed | Conversion of Intermediate mPAO Dimer | Conversion of LAO | Conversion Intermediate mPAO Dimer/ Conversion LAO |
|---|---|---|---|---|
| 3 | 1-decene | >80% (95% estimated) | 97% | >.82 (.98 estimated) |
| 4 | 1-octene | 89% | 91% | .98 |
| 5 | 1-dodecene | 91% | 79% | 1.15 |

Example 6

A trimer was oligomerized from 1-decene in a stainless steel Parr reactor using a $BF_3$ catalyst promoted with a $BF_3$ complex of butanol and butyl acetate. The reactor temperature was 32° C. with a 34.47 kPa (5 psi) partial pressure of $BF_3$ and catalyst concentration was 30 mmol of catalyst per 100 grams of feed. The catalyst and feeds were stopped after one hour and the reactor contents were allowed to react for one hour. These are the same conditions that were used in the reactions of Examples 3 to 5, except that 1-decene was fed to the reactor without any intermediate PAO dimer. A sample of the reaction effluent was then collected and analyzed by GC. TABLE 4 shows properties and yield of the resulting PAO trimer. This example is useful to show a comparison between an acid based oligomerization process with a pure LAO feed (Example 6) versus the same process with a mixed feed of the inventive intermediate mPAO dimer from Example 1 and LAO (Examples 3-5). The addition of the intermediate mPAO dimer contributes to a higher trimer yield and this trimer has improved VI and Noack Volatility.

TABLE 4

| Example | Co-dimer Yield (%) | KV at 100° C. (cSt) | KV at 40° C. (cSt) | IV | Pour Point (° C.) | Noack Volatility (%) |
|---|---|---|---|---|---|---|
| 3 | 77 | 3.52 | 13.7 | 129 | −75 | 9.97 |
| 4 | 71 | 3.20 | 12.5 | 124 | −81 | 18.1 |
| 5 | 71 | 4.00 | 16.9 | 139 | −66 | 7.23 |
| 6 | 62 | 3.60 | 15.3 | 119 | −75 | 17.15 |

Example 7

The intermediate mPAO dimer portion from a reaction using the procedure and catalysts system of Example 1 was oligomerized with 1-octene and 1-dodecene using an $AlCl_3$ catalyst in a five liter glass reactor. The intermediate mPAO dimer portion comprised 5% by mass of the combined LAO and dimer feed stream. The reactor temperature was 36° C., pressure was atmospheric, and catalyst concentration was 2.92% of the entire feed. The catalyst and feeds were stopped after three hours and the reactor contents were allowed to react for one hour. A sample was then collected and analyzed. TABLE 5 shows the amount of dimer in the reactor effluent as measured by GC (i.e., new dimer formed, and residual intermediate dimer) and the effluent's molecular weight distribution as determined by GPC.

Example 8

1-octene and 1-dodecene were fed to a reactor without any intermediate mPAO dimer following the same conditions and catalysts used in Example 7. TABLE 5 shows the amount of dimer in the reactor effluent and the effluent's molecular weight distribution. Comparing Examples 7 and 8 shows the addition of the intermediate mPAO dimer with high tri-substituted vinylene content to an acid catalyst process yielded a product with a similar weight distribution but with less dimer present; the lower dimer amounts being a commercially preferable result due to limited use of the dimer as a lubricant base stock.

TABLE 5

| Example | Dimer (mass %) | Mw/Mn | Mz/Mn |
|---|---|---|---|
| 7 | 0.79 | 1.36 | 1.77 |
| 8 | 1.08 | 1.36 | 1.76 |

Example 9

A 97% pure 1-decene was fed to a stainless steel Parr reactor where it was sparged with nitrogen for 1 hour to obtain a purified feed. The purified stream of 1-decene was then fed at a rate of 2080 grams per hour to a stainless steel Parr reactor for oligomerization. The oligomerization temperature was 120° C. The catalyst was Catalyst 1 prepared in a catalyst solution including purified toluene, tri n-octyl aluminum (TNOA), and Activator 1. The recipe of the catalyst solution, based on 1 gram of Catalyst 1, is provided below:

| Catalyst 1: | 1 gram |
|---|---|
| Purified Toluene: | 376 grams |
| 25% TNOA in Toluene: | 24 grams |
| Activator 1: | 1.9 grams. |

The 1-decene and catalyst solution were fed into the reactor at a ratio of 31,200 grams of 1-decene per gram of catalyst solution. Additional TNOA was also used as a scavenger to remove any polar impurities and added to the LAO at a rate of 0.8 grams of 0.25% TNOA in toluene per 100 grams of purified 1-decene. The residence time in the reactor was 2.8 hours. The reactor was run at liquid full conditions, with no addition of any gas. When the system reached steady-state, a sample was taken from the reactor effluent and the composition of the crude polymer was determined by GC. The percent conversion of 1-decene, shown in TABLE 6, was computed from the GC results. Kinematic viscosity of the intermediate PAO product (after monomer removal) was measured at 100° C.

Example 10

The procedure of Example 9 was followed with the exception that the reactor temperature was 110° C.

Example 11

The procedure of Example 9 was followed with the exception that the reactor temperature was 130° C.

Example 12

The procedure of Example 9 was followed with the exception that the residence time in the reactor was 2 hours and the catalyst amount was increased to 23,000 grams of LAO per gram of catalyst to attain a similar conversion as the above Examples.

Example 13

The procedure of Example 9 was followed with the exception that the residence time in the reactor was 4 hours and the catalyst amount was decreased to 46,000 grams of LAO per gram of catalyst to attain a similar conversion as the above Examples.

Example 14

The procedure of Example 9 was followed with the exception that the reactor was run in semi-batch mode (the feed streams were continuously added until the desired amount was achieved and then the reaction was allowed to continue without addition new feedstream) and the catalyst used was bis(1-butyl-3-methyl cyclopentadienyl) zirconium dichloride (hereinafter referred to as "Catalyst 2") that had been alkylated with an octyl group by TNOA. In this Example, conversion of LAO was only 44%. The kinematic viscosity at 100° C. is not reported due to low conversion.

TABLE 6

| Example | Catalyst System/ Catalyst Concentration (g LAO/g Cat) | Reaction Temp (° C.) | Residence Time in Reactor (hrs) | Conversion of LAO (% mass) | Effluent Kinematic Viscosity at 100° C. (cSt) | Intermediate PAO Kinematic Viscosity at 100° C. (cSt) |
|---|---|---|---|---|---|---|
| 9 | Catalyst 1/31,200 | 120 | 2.8 | 94 | 2.45 | 2.73 |
| 10 | Catalyst 1/31,200 | 110 | 2.8 | 93 | 3.26 | 3.55 |
| 11 | Catalyst 1/31,200 | 130 | 2.8 | 91 | 2.11 | 2.36 |
| 12 | Catalyst 1/23,000 | 120 | 2 | 94 | 2.42 | 2.77 |
| 13 | Catalyst 1/46,000 | 120 | 4 | 93 | 2.50 | 2.84 |
| 14 | Catalyst 2 (octylated)/31,200 | 120 | 2.8 | 44 | — | — |

Example 15

A dimer was formed using a process similar to what is described in U.S. Pat. No. 4,973,788. The LAO feedstock was 1-decene and TNOA was used as a catalyst. The contents were reacted for 86 hours at 120° C. and 172.37 kPa (25 psi) in a stainless steel Parr reactor. Following this, the dimer product portion was separated from the reactor effluent via distillation and its composition was analyzed via proton-NMR and is provided in TABLE 7.

TABLE 7

| Vinylidene | 96% |
|---|---|
| Di-substituted olefins | 4% |
| Tri-substituted olefins | 0% |

This C20 dimer portion was then contacted with a 1-octene feedstock and a butanol/butyl acetate promoter system in a second stainless steel Parr reactor. The molar feed ratio of dimer to LAO was 1:1, the molar feed ratio of butanol to butyl acetate was 1:1, and the promoter was fed at a rate of 30 mmol/100 grams of LAO. The reaction temperature was 32° C. with a 34.47 kPa (5 psi) partial pressure of BF3 providing the acid catalyst, the feed time was one hour, and then the contents were allowed to react for another hour. A sample was then taken from the product stream and analyzed via GC. The composition is provided below in TABLE 8. Applicants believe the dimer composition and other feedstocks used in this Example 15 are similar to the dimer composition and feedstocks used in multiple examples in U.S. Pat. No. 6,548,724.

Example 16

This example was based on an intermediate mPAO dimer resulting from a reaction using the procedure and catalyst system of Example 1; the resulting intermediate mPAO dimer had the same composition as set forth in TABLE 1. The intermediate mPAO dimer portion was reacted in a second reactor under feedstock and process conditions identical to the second oligomerization of Example 15. A sample of the PAO produced from the second oligomerization was taken from the product stream and analyzed via GC for its composition and the analysis is provided below in TABLE 8 (it is noted that this Example is a repeat of Example 4; the analyzed data is substantially similar for this second run of the same reactions and resulting PAO obtained from oligomerizing a primarily tri-substituted olefin).

TABLE 8

| Second reactor effluent | Example 15 | Example 16 |
|---|---|---|
| Unreacted monomer | 0.3% | 0.7% |
| Lighter fractions | 22.0% | 13.2% |
| $C_{28}$ fraction | 59.0% | 72.5% |
| Heavier fractions | 18.7% | 13.6% |

The yield of the C28 fraction was increased from 59.0%> to 72.5% by utilizing an intermediate dimer comprising primarily tri-substituted olefins instead of an intermediate dimer comprising primarily vinylidene olefins. Thus, use of an intermediate PAO dimer comprising primarily tri-substituted olefins is highly preferred over a dimer comprising primarily vinylidene due to the significant increases in yield of the C28 co-dimer product that is commercially valuable for low viscosity applications.

Example 17

Example 17 was prepared in a manner identical to Example 15, except that the LAO feedstock in the second reactor for the acid based oligomerization was 1-decene instead of 1-octene. Applicants believe the dimer composition and other feedstocks used in Example 17 are also similar to the dimer composition and feedstocks used in multiple examples in U.S. Pat. No. 6,548,724. A sample was taken from the product stream of the second reactor and analyzed via GC, and the composition is provided below in TABLE 9.

Example 18

Example 18 was performed identical to Example 16, except that the LAO feedstock in the second reactor was 1-decene instead of 1-octene. A sample was taken from the product stream of the second reactor and analyzed. The overall composition of the reactor PAO product is provided below in TABLE 9. The C30 fraction, prior to hydrogenation, has approximately 21% tetra-substituted olefins, as determined by carbon-NMR; the remaining structure is a mixture of vinylidene and tri-substituted olefins.

TABLE 9

| Second Reactor Effluent | Example 17 | Example 18 |
|---|---|---|
| Unreacted Monomer | 0.7% | 0.7% |
| Lighter Fractions | 7.3% | 9.0% |
| $C_{30}$ Fraction | 71.4% | 76.1% |
| Heavier Fractions | 20.6% | 14.2% |

Examples 17 and 18 show that, again, using a dimer intermediate comprising primarily tri-substituted olefins increases the yield of the desired C30 product. Since the carbon number of the co-dimer and the C10 trimer is the same in these experiments, it is infeasible to separately quantify the amount of co-dimer and C10 trimer. Instead, the C30 material was separated via distillation and the product properties were measured for both Examples 17 and 18.

For comparison purposes, a C10 trimer was obtained from a BF3 oligomerization wherein the above procedures for the second reactor of Examples 17 and 18 were used to obtain the trimer; i.e. there was no first reaction with either TNOA or Catalyst 1 and thus, no dimer feed element in the acid catalyst oligomerization. Properties of this C10 trimer were measured and are summarized in TABLE 10 and compared to the C30 trimers of Examples 17 and 18.

TABLE 10

| Example | KV at 100° C. (cSt) | KV at 40° C. (cSt) | VI | Pour Point (° C.) | Noack Volatility (%) |
|---|---|---|---|---|---|
| Example 17 $C_{30}$ | 3.47 | 14.1 | 127 | −69 | 13.9 |
| Example 18 $C_{30}$ | 3.50 | 14.1 | 130 | −78 | 12.0 |
| $BF_3$ $C_{10}$ trimer | 3.60 | 15.3 | 119 | −75 | 17.2 |

TABLE 10 evidences a clear difference between a C30 material formed using a tri-substituted vinylene dimer feed element in a BF3 oligomerization (Example 18) versus a C30 material formed in a BF3 oligomerization using a vinylidene dimer feed element (Example 17). The C30 material obtained using tri-substituted vinylene dimers has a similar viscosity with a significantly improved VI and a lower Noack Volatility than the C30 material obtained using vinylidene dimers under equivalent process conditions. Furthermore, the C30 material obtained using vinylidene dimers has properties more similar to those of a C 10 trimer in a BF3 process than the C30 material obtained using tri-substituted vinylene dimers, indicating that a greater portion of the C30 yield is a C10 trimer and not a co-dimer of the vinylidene dimer and 1-decene.

Example 19

Example 19 was prepared using the catalyst system and process steps of Example 1 except that the starting LAO feed was 97% pure 1-octene and the oligomerization temperature was 130° C. When the system reached steady-state, a sample was taken from the reactor effluent and fractionated to obtain C16 olefin portion (1-octene dimer) that was approximately 98% pure. This intermediate PAO dimer was analyzed by proton NMR and had greater than 50% tri-substituted olefin content.

This intermediate mPAO dimer portion was then oligomerized with 1-dodecene, using a BF3 catalyst, and a butanol/butyl acetate promoter system in a second reactor. The intermediate mPAO dimer was fed at a 1:1 mole ratio to the 1-dodecene and catalyst concentration was 30 mmol of catalyst per 100 grams of feed. The reactor temperature was 32° C. The catalyst and feeds were stopped after one hour and the reactor contents were allowed to react for one additional hour. A sample was then collected, analyzed by GC (see TABLE 12), and fractionated to obtain a cut of C28 that was about 97% pure. The C28 olefin portion was hydrogenated and analyzed for its properties; results are shown in TABLE 11.

Example 20

Similar to Example 19, except that the intermediate mPAO C16 dimer portion produced was oligomerized with 1-tetradecene, instead of 1-dodecene. A sample was collected from the second reactor and analyzed by GC for fraction content (see TABLE 12). The C30 olefin portion of the effluent was obtained via conventional distillation means and the trimer was hydrogenated and analyzed for its properties; results are shown in TABLE 11.

Example 21

Similar to Example 19, except that the intermediate mPAO C16 dimer portion produced was oligomerized with 1-hexadecene, instead of 1-dodecene, in the subsequent step to produce a C32 trimer. A sample was collected from the second reactor and analyzed by GC for fraction content (see TABLE 12). The C32 olefin portion of the effluent was obtained via conventional distillation means and the trimer was hydrogenated and analyzed for its properties; results are shown in TABLE 11.

Example 22

Example 22 was prepared using the catalyst system and process steps of Example 1 except that the LAO feed was 97% pure 1-dodecene and the oligomerization temperature was 130° C. When the system reached steady-state, a sample was taken from the reactor effluent and fractionated to obtain a C24 olefin (1-dodecene dimer) portion that was about 98% pure. This intermediate mPAO dimer was analyzed by proton-NMR and had greater than 50% tri-substituted olefin content.

The C24 intermediate mPAO dimer portion was then oligomerized with 1-hexene, using a BF3 catalyst, and a butanol/butyl acetate promoter system in a second reactor. The C24 intermediate PAO dimer was fed at a 1:1 mole ratio to the 1-hexene and catalyst concentration was 30 mmol of catalyst per 100 grams of feed. The reactor temperature was 32° C. The catalyst and feeds were stopped after one hour and the reactor contents were allowed to react for one additional hour. A sample was then collected, analyzed by GC (see TABLE 12), and fractionated to obtain cut of C30 olefin that was about 97%) pure. The C30 olefin portion was hydrogenated and analyzed for its properties, and results are shown in TABLE 11.

Example 23

Similar to Example 22, except that the intermediate mPAO dimer portion produced in the first reaction was then oligomerized with 1-octene, instead of 1-hexene, in the subsequent acid based oligomerization step to produce a C32 olefin. Results are shown in TABLE 11.

Example 24

Example 24 was prepared using the same process and catalyst system as Example 1 except that the first oligomerization temperature was 130° C. When the system reached steady-state, a sample was taken from the reactor effluent and fractionated to obtain a C20 intermediate mPAO dimer portion that was about 98% pure. The distilled dimer was analyzed by proton-NMR and had greater than 50% tri-substituted olefin content.

The C20 intermediate mPAO dimer portion was then oligomerized with 1-decene, a BF3 catalyst, and a butanol/butyl acetate promoter system in a second reactor. The intermediate mPAO dimer was fed at a 1:1 mole ratio to 1-decene and catalyst concentration was 30 mmol of catalyst per 100 grams of feed. The reactor temperature was 32° C. The catalyst and feeds were stopped after one hour and the reactor contents were allowed to react for one additional hour. A sample was then collected, analyzed by GC (see TABLE 12), and then fractionated to obtain cut of C30 olefin that was about 97% pure. The C30 olefin portion was hydrogenated and analyzed; results are shown in TABLE 11. Applicants note that this Example 24 is similar to Example 3, with the sole difference being the first reaction temperature. A comparison of the data in TABLE 4 and TABLE 11 shows that for the higher first reaction temperature of Example 24, the kinematic viscosity and VI are comparable, and the pour point is decreased with a minor increase in Noack volatility.

Example 25

Similar to Example 24 except that the intermediate mPAO dimer portion produced was oligomerized with 1-octene, instead of 1-decene, in the subsequent reaction step to produce a C28 olefin. Results are shown in TABLE 11. This data is comparable to Example 4, with substantially similar product results, even with an increased temperature in the first reactor for Example 25.

Example 26

Similar to Example 24 except that the intermediate PAO dimer portion produced was oligomerized with 1-dodecene, instead of 1-decene, in the subsequent step to produce a C32 olefin. Results are shown in TABLE 11. This data is comparable to Example 5, with substantially similar product results, even with an increased temperature in the first reactor for Example 26.

TABLE 11

| Example | Product Carbon Number | Kinematic Viscosity @ 100° C., cSt | VI | Pour Point, ° C. | Noack Volatility, wt % |
|---|---|---|---|---|---|
| 19 | 28 | 3.18 | 121 | −81 | 18.9 |
| 20 | 30 | 3.66 | 131 | −57 | 12.1 |
| 21 | 32 | 4.22 | 138 | −33 | 8.7 |
| 22 | 30 | 3.77 | 137 | −54 | 11.0 |
| 23 | 32 | 4.05 | 139 | −57 | 7.2 |
| 24 | 30 | 3.50 | 130 | −78 | 11.5 |
| 25 | 28 | 3.18 | 124 | −81 | 18 |
| 26 | 32 | 4.01 | 139 | −66 | 7.2 |

TABLE 12

| Example | Monomer, wt. % | $C_{18}$-$C_{26}$, wt. % | Desired Product, wt. % | >$C_{32}$ wt. % |
|---|---|---|---|---|
| 19 | 6.7 | 0.4 | 85.6 | 7.3 |
| 20 | 7.0 | 0.4 | 88.1 | 4.5 |
| 21 | 0.8 | 8.8 | 84.8 | 5.6 |
| 22 | 1.2 | 24.9 | 54.0 | 19.9 |
| 23 | 3.8 | 22.6 | 65.2 | 8.4 |
| 24 | 1.0 | 13.4 | 78.0 | 7.6 |
| 25 | 3.1 | 18.0 | 66.6 | 12.3 |
| 26 | 7.9 | 11.2 | 71.5 | 9.4 |

In comparing the properties and yields for each example, additional advantages to the invention are clear. For example, comparing Examples 19-21 to their carbon number equivalents in Examples 24-26 shows that the molecules in each Example with equivalent carbon numbers have similar properties. The processes of Examples 19-21, however, result in yields of desired products about 20% greater than the processes of Examples 24-26. Additionally, comparing Examples 22 and 23 to their carbon number equivalents in Examples 24 and 26 shows that the inventive products exhibit higher Vis at similar kinematic viscosities.

Functional Fluid Examples

Multiple functional fluids were prepared using low-viscosity base stocks and tested for performance. The low-viscosity base stocks are listed in TABLE 13 below, and the functional fluids, which are formulated as transmission fluids, are listed in TABLE 14 below. In TABLE 13, "PAO-3.4" is a low-viscosity PAO base stock having a KV100 of 3.4 cSt prepared by a process described in Example 9 above; "PAO-3.5" is a low-viscosity PAO base stock having a KV100 of 3.5 cSt prepared by a process described in Example 18 above; PAO-4 is a commercial PAO base stock having a KV100 of 4.0 cSt available from ExxonMobil Chemical Company having an address at 4500 Bayway Drive, Baytown, Tex. 77450, made by oligomerization of linear alpha-olefins in the presence of a Lewis acid catalyst; and GTL-4 is a commercial GTL base stock having a KV100 of about 4.0 cSt available from Shell Oil Company. The Group III base stock is Yubase 4, a commercial base stock available from SK Lubricants Co., Ltd. having an address at 26, Jongro, Jongro-Gu, Seoul 03188, Korea. The Group III+ base stock is Yubase 4 Plus, a commercial stock also available from SK Lubricants Co., Ltd.

TABLE 13

| Property | Method | PAO-3.4 | PAO-3.5 | PAO-4 | GTL-4 | Group III | Group III+ |
|---|---|---|---|---|---|---|---|
| KV100 (cSt) | D445 | 3.39 | 3.50 | 4.10 | 4.11 | 4.23 | 4.16 |
| KV40 (cSt) | D445 | 13.50 | 15.08 | 18.40 | 18.3 | 19.57 | 17.90 |
| VI | D2270 | 128 | 131 | 126 | 129 | 122 | 134 |
| NV (wt %) | D5800 | 12.5 | 12.1 | 12.4 | 11.9 | 15.0 | 13 |
| HTHSV@150° C. (cp) | D4683 | 1.011 | 1.280 | 1.460 | 1.50 | 1.474 | 1.477 |
| Pour Point (° C.) | D5950 | −75 | −78 | −66 | −33 | −15 | −18 |
| CCSV@−30° C. (cp) | D5293 | 358 | 427 | 835 | 1029 | 1524 | 1190 |
| CCSV@−35° C. (cp) | D5293 | 623 | 728 | 1430 | 1780 | 2743 | 2045 |
| RPVOT (min) | D2272 | 88 | — | 41 | 35 | 40 | 40 |

As can be seen from TABLE 13, the PAO-3.4 and PAO-3.5 base stocks have CCSV at −30° C. and −35° C., and HTHSV values significantly lower than PAO-4 and GTL-4. In addition, the PAO-3.4 and PAO-3.5 base stocks have much higher RPVOT values than PAO-4 and GTL-4. The PAO-3.5 and PAO-3.4 base stocks have comparable NV values to PAO-4. All these exceptional properties of the PAO-3.4 and PAO-3.5 base stocks render them superior base stocks for transmission fluids, especially transmission fluids for hybrid engines where the transmission fluids is exposed to high temperature electric motor. Furthermore, the PAO-3.4, PAO-3.5, and PAO-4 base stocks all have far lower pour point than GTL-4. In sum, compared to commercial GTL and conventional PAO base stocks having similar KV100, the PAO-3.4 base stock made from a metallocene-catalyzed process, and the PAO-3.5 base stock made from a hybrid process including a step of metallocene-catalyzed oligomerization to produce a dimer, followed by a Lewis-acid-catalyzed oligomerization between the dimer and a LAO monomer, are much better base stocks for high-quality transmission fluids and other functional fluids.

Transmission Fluids 1, 2, 3, and 4

Functional fluids intended as transmission fluids were formulated from the PAO-3.4, PAO-3.5. PAO-4, and GTL-4 base stocks and tested. Composition and properties are provided in TABLE 14 below. In this table, HiTec 3419D is a commercial additive package available from Afton Chemical Corporation having an address at 500 Spring Street, Richmond, Va. 23219 U.S.A.

As can be seen from TABLE 14 above, Fluids 1 and 2, formulated from the PAO-3.4 and PAO-3.5 base stocks, respectively, exhibited much superior low-temperature properties, i.e., much lower Brookfield viscosities, CCSV at −25, −30, and −35° C., and much lower MRV apparent viscosity values at −30 and −35° C., compared to Fluids 3 and 4, which are formulated from commercial PAO-4 and GTL-4 base stocks, respectively. In addition, Fluids 1 and 2 exhibited much lower HTHSV at 150° C. than Fluids 3 and 4, indicating superiority at high temperature and high shear situations in transmissions with lower viscosities.

The functional fluids in the above TABLE 14 were then tested for low traction performance under the following mini-traction machine ("MTM") testing conditions: Load: 30 Newton; Speed: 2 m/s, and slide roll ratio ("SRR"): 0-70%. Testing results are shown in FIG. 1. As can be seen, Fluids 1 and 2, based on the PAO-3.4 and PA-3.5 base stocks, respectively, demonstrated superior low traction performance to Fluids 3 and 4, based on conventional PAO-4 and GTL-4, respectively, which can result in higher energy efficiency and better fuel economy.

The above Fluids 1-4 were then tested for oxidative stability at 170° C. for 192/384 hours pursuant to CEL L48. Testing results are reported in the following TABLE 15. In this table, "PDSC" means pressure differential scanning calorimeter, and "ΔKV" means change in kinematic viscosity at the end of the testing period.

TABLE 15

| | Fluid 1 | Fluid 2 | Fluid 3 | Fluid 4 | Method |
|---|---|---|---|---|---|
| Base stock | PAO-3.4 | PAO-3.5 | PAO-4 | GTL-4 | |
| PDSC (min) | 24 | 21 | 15 | 10 | PDSC |

TABLE 14

| | Fluid 1 | Fluid 2 | Fluid 3 | Fluid 4 |
|---|---|---|---|---|
| Base stock | PAO-3.4 | PAO-3.5 | PAO-4 | GTL-4 |
| Treat rate of base stock (%) | 88% | 88% | 88% | 88% |
| Additive package | HiTec 3419D | HiTec 3419D | HiTec 3419D | HiTec 3419D |
| Treat rate of additive package | 12% | 12% | 12% | 12% |
| KV100 (cSt) | 4.023 | 4.173 | 4.860 | 4.802 |
| KV40 (cSt) | 17.22 | 18.14 | 23.28 | 22.96 |
| VI | 136 | 137 | 135 | 134 |
| NV (wt %) | 11.95 | 11.58 | 10.23 | 12.83 |
| Pour point (° C.) | −75 | −78 | −66 | −66 |
| Brookfield (centipoise) | 2034 | 2148 | 3738 | 5088 |
| CCSV @ −25° C. (centipoise) | 475 | 490 | 809 | 1014 |
| CCSV @ −30° C. (centipoise) | 722 | 777 | 1333 | 1649 |
| CCSV @ −35° C. (centipoise) | 1161 | 1253 | 2135 | 2789 |
| MRV @ −30° C. (centipoise) | 704 | 758 | 1295 | 1629 |
| MRV @ −35° C. (centipoise) | 1106 | 1209 | 2026 | 2645 |
| HTHSV @ 150° C. (centipoise) | 1.391 | 1.456 | 1.639 | 1.596 |
| Thermal conductivity at 40° C. (W · (m · K)$^{-1}$) | 0.14 | 0.14 | 0.14 | 0.13 |

TABLE 15-continued

| | Fluid 1 | Fluid 2 | Fluid 3 | Fluid 4 | Method |
|---|---|---|---|---|---|
| AKV 40° C. after 192 hours | 0.56 | 0.6 | 1.13 | 0.36 | CEL L48 |
| AKV 100° C. after 192 hours | 0.13 | 0.1 | 0.21 | 0.1 | |
| AKV 40° C. after 384 hours | 2.95 | 3.79 | 8.48 | 5.01 | |
| AKV 100° C. after 384 hours | 0.71 | 0.9 | 1.75 | 0.99 | |
| Sludge rating after 192 hours | 1 | 1 | 1 | 1 | |
| Oxidation by FT-IR after 192 hours | 47.29 | 47.62 | 47.56 | 48.67 | |
| Sludge rating after 384 hours | 2 | 2 | 2 | 2 | |
| Oxidation by FT-IR after 384 hours | 60.47 | 55.7 | 68.9 | 67.88 | |

As can be seen from the test data in TABLE 15 above, Fluids 1 and 2 demonstrated excellent oxidative stability superior to Fluids 3 and 4 in many respects. Specifically, Fluids 1 and 2 showed much longer PDSC time than Fluids 3 and 4. Fluids 1 and 2 showed much lower AKV at 40° C. and 100° C. after 384 hours compared to both Fluids 3 and 4. Fluids 1 and 2 showed much lower ≠KV at 40° C. and 100° C. after 192 hours compared to Fluid 3. Fluids 1 and 2 showed much lower oxidation by FT-IR after 384 hours compared to both Fluids 3 and 4.

Clutch Fluids 5, 6, and 7

A series of clutch fluids (Fluids 5, 6, and 7) were formulated from the above PAO-3.4 base stock, and/or commercial Groups II, II+, III, and III+ base stocks, and tested. Fluid 5 is identical to Fluid 1. The compositions and test data are presented in TABLE 16 below. Clearly, Fluid 5 made from the PAO-3.4 base stock demonstrated much lower pour point and Brookfield viscosity at −40° C., as well as Noack volatility at 200° C. and 250° C. compared to Fluids 6 and 7 made from Groups II, II+, III, and III+ base stocks, which are highly desired for clutch fluids.

TABLE 16

| | | Fluid 5 | Fluid 6 | Fluid 7 |
|---|---|---|---|---|
| Composition (wt %) | PAO 3.4 | 88 | — | — |
| | Group III + (GTL 4) | — | 44 | — |
| | Group III (Yubase 4) | — | — | 22 |
| | Group II + (GTL 3) | — | 44 | — |
| | Group II (Yubase 3) | — | — | 66 |
| | Additives | 12 | 12 | 12 |
| KV100 (cSt) | | 4.02 | 4.03 | 3.98 |
| KV40 (cSt) | | 17.22 | 17.48 | 17.90 |
| Viscosity Index | | 136 | 132 | 121 |
| Pour Point (° C.) | | −75 | −66 | −51 |
| Brookfield Viscosity @ −40° C. | | 2,034 | 3,846 | 15,237 |
| Specific Gravity @ 15.6° C. (ASTM D4052) | | 0.823 | 0.825 | 0.843 |
| Noack Volatility, evaporation loss @ 250° C. (wt %) | | 11.95 | 25.25 | 37.65 |
| Noack Volatility, evaporation loss @ 200° C. (wt %) | | 1.92 | 4.85 | 5.86 |

Figure 2:
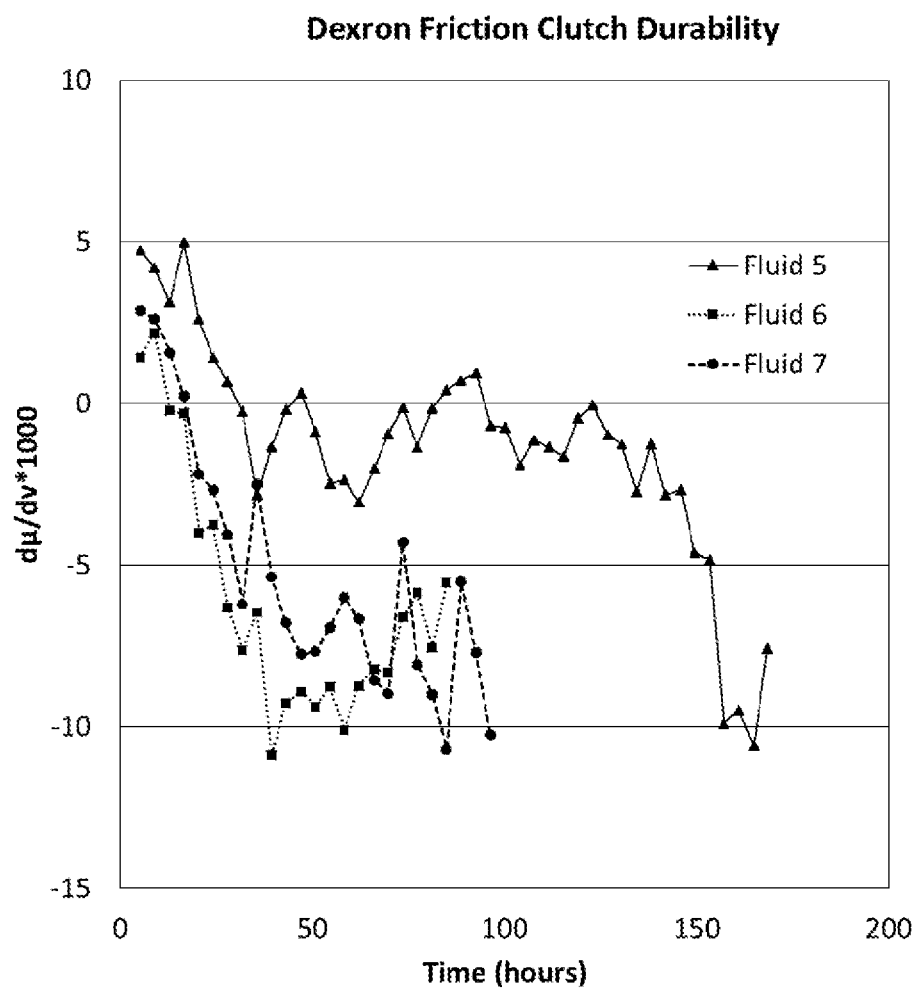
FIG. 2 is a diagram showing Dexron clutch friction durability of Fluids 5, 6, and 7 in TABLE 16 of this disclosure.

Fluids 5, 6, and 7 were then tested for Dexron Clutch Friction Durability. Testing results are presented in FIG. 2. From FIG. 2, it can be clearly seen that Fluid 5 demonstrated much superior clutch durability performance compared to Fluids 6 and 7, showing superiority of the PAO-3.4 base stock to Groups II, II+, III, and III+ base stocks in formulating clutch fluids. The high performance of Fluid 5, enabled by the PAO-3.4 base stock, can help with delivering more smooth torque transfer, driver comfort and higher durability of the clutch system compared to Fluids 6 and 7 formulated from Groups II, II+, III, and III+ base stocks.

Industrial Gear Oil Fluids 8 and 9

Figure 3:
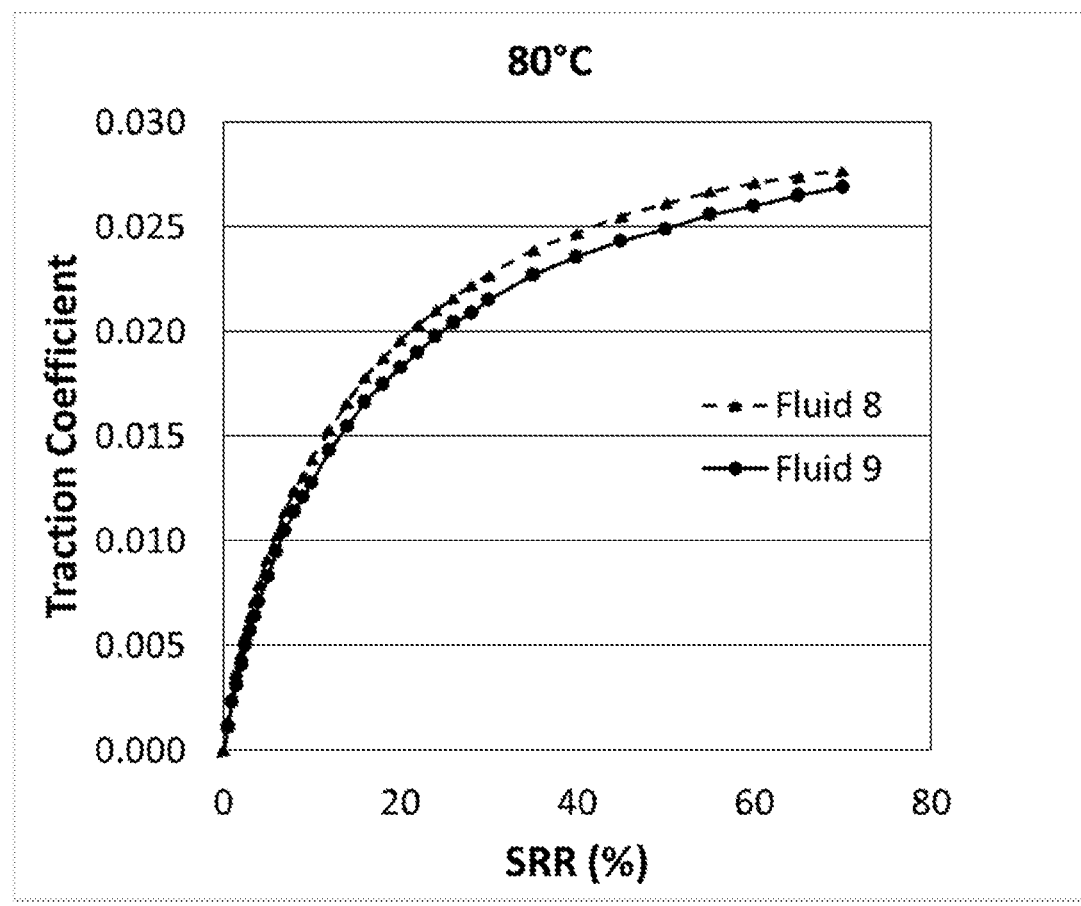
FIG. 3 is a diagram showing traction coefficient at 80° C. of Fluids 8 and 9 in TABLE 17 of this disclosure.
Figure 4:
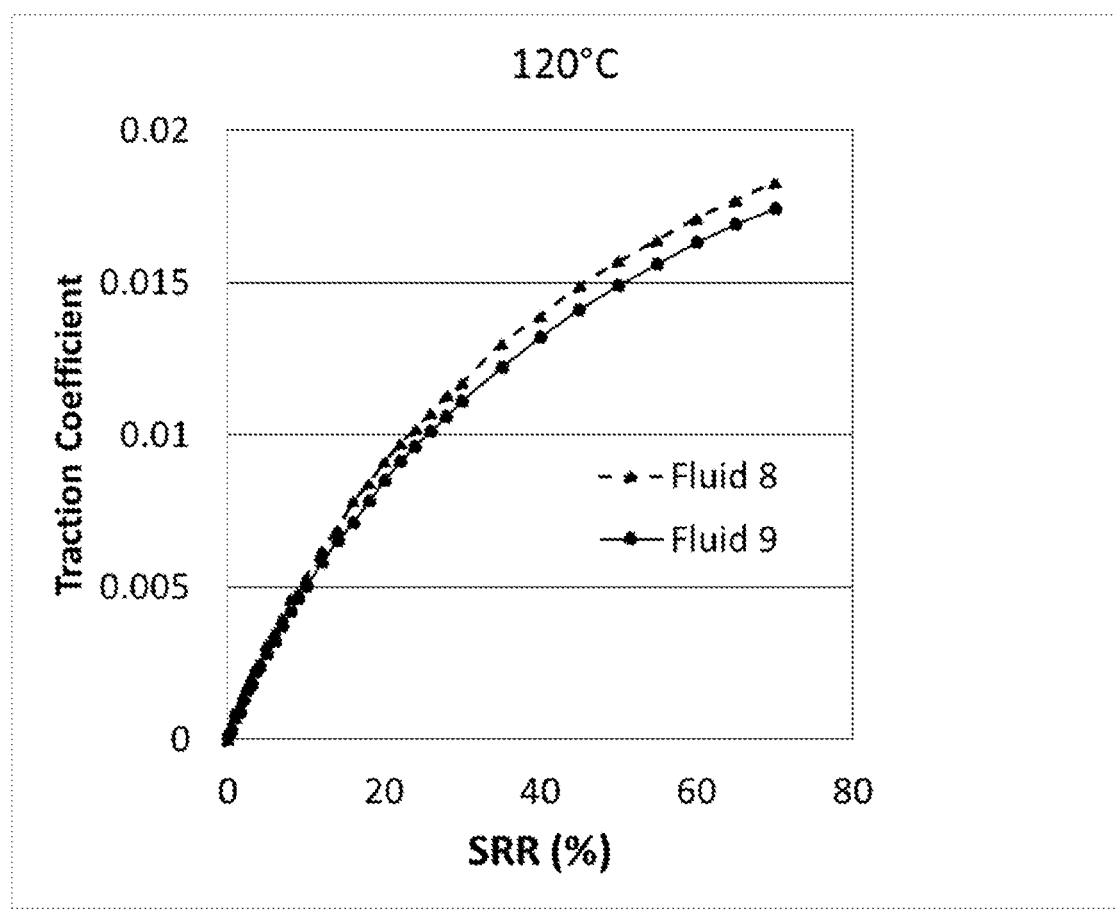
FIG. 4 is a diagram showing traction coefficient at 120° C. of Fluids 8 and 9 in TABLE 17 of this disclosure.

Two industrial gear oil fluids (Fluids 8 and 9) were formulated from a high-viscosity PAO base stock, i.e., SpectraSyn Elite™ 150 ("mPAO-150"), a PAO base stock having a KV100 of about 150 cSt available from ExxonMobil Chemical Company, an ester base stock, i.e., Esterex A51, also available from ExxonMobil Chemical Company, and the PAO-3.4 base stock described above or a conventional PAO base stock having a KV100 of about 6 cSt. The compositions of Fluids 8 and 9 are provided in TABLE 17 below. The two fluids were then tested for traction coefficient at 80° C. and 120° C., and the test results are presented in FIGS. 3 and 4. As can be clearly seen, Fluid 9 comprising the PAO-3.4 demonstrated lower traction at both temperatures compared to Fluid 8. Thus, Fluid 9 would exhibit higher energy efficiency compared to Fluid 8 as industrial gear oils. As such, the PAO-3.4 base stock can help improve traction and therefore energy efficiency and fuel economy compared to conventional low-viscosity PAO base stock when formulated into industrial gear oil fluids at low treat rates with high viscosity base stocks.

TABLE 17

| | | Fluid 8 | Fluid 9 |
|---|---|---|---|
| Composition (wt %) | mPAO-150 | 65 | 69.67 |
| | PAO-6 | 20.35 | — |
| | PAO-3.4 | — | 15.68 |
| | Esterex™ A51 | 12 | 12 |
| | Additive Package | 2.65 | 2.65 |
| KV100 (cSt) | | 43.58 | 44.81 |
| KV40 (cSt) | | 340.4 | 340.6 |
| Viscosity Index | | 185 | 190 |
| Pour Point (° C.) | | −54 | −54 |

What is claimed is:

1. A functional fluid for a clutch, a gear box, a transmission and/or an electric motor and/or a battery pack comprising a saturated polyalpha-olefin ("PAO") first base stock at a concentration thereof in the range from 3 wt % to 98 wt %, based on the total weight of the functional fluid, the first base stock having:
   a kinematic viscosity at 100° C. determined pursuant to ASTM D445 ("KV100") in the range from 3.0 to 3.6 cSt;
   a Noack volatility determined pursuant to ASTM D5800 ("NV") not higher than 12.5%; and
   a high-temperature high-shear viscosity determined pursuant to ASTM ("HTHSV") at 150° C. of no greater than 1.4 centipoise.

2. The functional fluid of claim 1 comprising the first base stock at a concentration thereof in the range from 50 wt % to 98 wt %, based on the total weight of the functional fluid.

3. The functional fluid of claim 1, wherein the first base stock comprises C28-C32 polyalpha-olefin oligomers at a concentration of no less than 95 wt %, based on the total weight of the first base stock.

4. The functional fluid of claim 3, wherein the first base stock comprises C30 polyalpha-olefin oligomers at a concentration of no less than 95 wt %, based on the total weight of the first base stock.

5. The functional fluid of claim 1, wherein the first base stock comprises polyalpha-olefin oligomers having the following formula at a total concentration thereof, based on the total weight of the first base stock. of no less than 80 wt %:

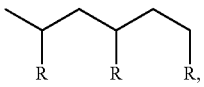

wherein each R is independently an n-butyl, n-hexyl, n-octyl, n-decyl, or n-dodecyl.

6. The functional fluid of claim 1, wherein the first base stock has a cold-crank-simulator viscosity at −35° C. determined pursuant to ASTM D4683 ("CCSV") of no higher than 1,000 centipoise.

7. The functional fluid claim 1, wherein the PAO has a thermal conductivity at 40° C. in the range from 0.11 to 0.16 watt·meter$^{-1}$·K$^{-1}$.

8. The functional fluid of claim 1, further comprising a Group I, II, III, IV, or V second base stock at a concentration in the range from 0 to 97 wt %, based on the total weight of the functional fluid, and one or more additives at a total concentration thereof in the range from 0 to 20 wt %, based on the total weight of the functional fluid.

9. The functional fluid of claim 1, having a KV100 in the range from 3.5 to 4.2 cSt, and a Noack Volatility in the range from 10 to 13 wt %.

10. The functional fluid of claim 1, which is a hybrid vehicle transmission fluid and/or an electric motor cooling fluid and/or a battery pack cooling fluid.

11. The functional fluid of claim 1, wherein at least a portion of the first base stock is produced by a process selected from:
   (i) a first process comprising oligomerizing one or more C6 to C14 alpha-olefin in the presence of a catalyst system comprising a metallocene compound to obtain a first oligomer mixture, separating a first unhydrogenated precursor to the first base stock from the oligomer mixture, followed by hydrogenating the first unhydrogenated precursor; and
   (ii) a second process comprising producing a second oligomer of one or more C6 to C14 alpha-olefin in the presence of a catalyst system comprising a metallocene compound, reacting the second oligomer with one or more C6 to C14 alpha-olefin in the presence of a Lewis acid catalyst to obtain a third oligomer mixture, separating a second unhydrogenated precursor to the first base stock from the third oligomer mixture, followed by hydrogenating the second unhydrogenated precursor.

12. The functional fluid of claim 11, wherein in process (ii), the second oligomer consists essentially of a dimer of the one or more of the alpha-olefin.

13. The functional fluid of claim 12, wherein the first base stock is produced from a process (ii) in which the dimer comprises at least 40 wt % of tri-substituted olefin(s), based on the total weight of the dimer.

14. The functional fluid of claim 11, wherein the first base stock is produced from a monomer consisting essentially of 1-decene.

15. The functional fluid of claim 12, wherein the first base stock is produced from a process (ii) in which the second unhydrogenated precursor comprises at least 50 wt % of either tetra-substituted olefin(s) or tri-substituted olefins, based on the total weight of the separated precursor.

16. The functional fluid of claim 1, wherein the PAO has a rotating pressure vessel oxidation test (RPVOT) break time, determined pursuant to ASTM-D-2272, of at least about 70 minutes.

17. The functional fluid of claim 1, wherein the PAO has a RPVOT break time, determined pursuant to ASTM-D-2272, of at least about 80 minutes.

18. The functional fluid of claim 1, wherein the first base stock has a pour point determined pursuant to ASTM D5950 of no higher than −69° C.

19. A process for lubricating and/or cooling an engine transmission, a gearbox, a clutch, an electric motor, and/or a battery pack, comprising:
   (I) providing a functional fluid comprising a saturated polyalpha-olefin ("PAO") first base stock at a concentration thereof in the range from 3 wt % to 98 wt %, based on the total weight of the functional fluid, the PAO base stock having:
      a kinematic viscosity at 100° C. determined pursuant to ASTM D445 ("KV100") in the range from 3.0 to 3.6 cSt;
      a high-temperature high-shear viscosity determined pursuant to ASTM ("HTHSV") at 150° C. of no greater than 1.4 centipoise;
      a Noack volatility determined pursuant to ASTM D5800 ("NV") not higher than 12.5%; and
   (II) contacting the functional fluid with the engine transmission, the electric motor, and/or the battery pack.

20. The process of claim 19, wherein step (II) comprises contacting the functional fluid with both the engine transmission and the electric motor in a hybrid vehicle.

21. The process of claim 19 wherein step (I) comprises one or both of the following processes:
   (i) oligomerizing one or more C6 to C14 alpha-olefin in the presence of a catalyst system comprising a metallocene compound to obtain a first oligomer mixture, separating a first unhydrogenated precursor to the first base stock from the oligomer mixture, followed by hydrogenating the first unhydrogenated precursor; and
   (ii) producing a second oligomer of one or more C6 to C14 alpha-olefin in the presence of a catalyst system comprising a metallocene compound, reacting the second oligomer with one or more C6 to C14 alpha-olefin in the presence of a Lewis acid catalyst to obtain a third oligomer mixture, separating a second unhydrogenated precursor to the first base stock from the third oligomer mixture, followed by hydrogenating the second unhydrogenated precursor.

22. The process of claim 21, wherein the one or more C6 to C14 alpha-olefin consists essentially of 1-decene.

23. The process of claim 19, wherein the first base stock comprises C28-C32 polyalpha-olefin oligomers at a concentration of no less than 95 wt %, based on the total weight of the first base stock.

24. The process of claim 19, wherein the first base stock comprises polyalpha-olefin oligomers having the following formula at a total concentration thereof, based on the total weight of the first base stock, of no less than 80 wt %:

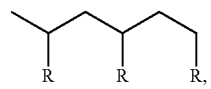

wherein each R is independently an n-hexyl, n-octyl, or n-decyl.

25. The process of claim 19, wherein the first base stock has a cold-crank-simulator viscosity at −35° C. determined pursuant to ASTM D4683 ("CCS") of no higher than 1,000 centipoise.

26. The process of claim 19, wherein the functional fluid has a KV100 in the range from 3.5 to 4.2 cSt, and an NV in the range from 10 to 13 wt %.

27. The process of claim 19, wherein the PAO has a RPVOT break time, determined pursuant to ASTM-D-2272, of at least about 70 minutes.

28. The process of claim 19, wherein the PAO has a pour point determined pursuant to ASTM D5950 of no higher than −69° C.

* * * * *